US012707534B2

(12) United States Patent
Xue et al.

(10) Patent No.: US 12,707,534 B2
(45) Date of Patent: Aug. 11, 2026

(54) DISCONTINUOUS RECEPTION CONFIGURATION METHOD AND APPARATUS

(71) Applicant: Huawei Technologies Co., Ltd., Shenzhen (CN)

(72) Inventors: Yifan Xue, Beijing (CN); Fanhua Kong, Shenzhen (CN); Lixia Xue, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 252 days.

(21) Appl. No.: 18/489,549

(22) Filed: Oct. 18, 2023

(65) Prior Publication Data

US 2024/0049347 A1 Feb. 8, 2024

Related U.S. Application Data

(63) Continuation of application No. PCT/CN2022/087464, filed on Apr. 18, 2022.

(30) Foreign Application Priority Data

Apr. 20, 2021 (CN) ........................ 202110427057.X
May 8, 2021 (CN) ........................ 202110502448.3

(51) Int. Cl.
*H04W 76/28* (2018.01)

(52) U.S. Cl.
CPC .................................. *H04W 76/28* (2018.02)

(58) Field of Classification Search
CPC ..... H04W 76/00; H04W 76/20; H04W 76/28; H04L 67/143; H04L 67/145
See application file for complete search history.

(56) References Cited

U.S. PATENT DOCUMENTS 9,532,308 B2 * 12/2016 Han .................. H04W 52/0216
2020/0092938 A1 * 3/2020 Tang ................ H04W 52/0216
(Continued)

FOREIGN PATENT DOCUMENTS

CN 101925161 * 12/2010 ............ H04W 52/02
CN 103024879 * 4/2013 ............ H04W 52/02
(Continued)

OTHER PUBLICATIONS

Qualcomm Incorporated: "Potential Enhancements for XR", 3GPP TSG RAN WG1 #104-bis-e, e-Meeting, Apr. 12-Apr. 20, 2021, R1-2103195, total 12 pages.

(Continued)

*Primary Examiner* — Warner Wong
(74) *Attorney, Agent, or Firm* — Slater Matsil, LLP

(57) ABSTRACT

A terminal device receives discontinuous reception DRX configuration information from a network device, where the DRX configuration information includes at least configuration information of a first DRX, and the configuration information of the first DRX includes a cycle length of the first DRX; and determines, based on the DRX configuration information, to receive a downlink signal within at least first onDuration and second onDuration, where the second onDuration is next onDuration of the first onDuration, and a time interval between a start location of the first onDuration and a start location of the second onDuration is greater than the cycle length of the first DRX.

20 Claims, 10 Drawing Sheets

Network device

Terminal device

401: Send DRX configuration information to the terminal device

402: Receive the DRX configuration information from the network device, determine a start location of first on-duration and a start location of second on-duration based on the DRX configuration information, and receive a downlink signal within the first on-duration and the second on-duration

(56) References Cited

U.S. PATENT DOCUMENTS

| | | | | |
|---|---|---|---|---|
| 2021/0022077 | A1* | 1/2021 | Mazloum | H04W 72/12 |
| 2022/0217637 | A1* | 7/2022 | Li | H04W 52/0241 |
| 2023/0067569 | A1* | 3/2023 | Manolakos | H04W 24/10 |
| 2023/0171698 | A1* | 6/2023 | Wei | H04W 72/23 370/318 |
| 2023/0209650 | A1* | 6/2023 | Narula | H04L 41/0803 370/336 |
| 2023/0379745 | A1* | 11/2023 | Chen | H04W 52/028 |
| 2024/0089991 | A1* | 3/2024 | Zhao | H04W 76/28 |
| 2025/0008597 | A1* | 1/2025 | Kunt | H04W 52/0216 |

FOREIGN PATENT DOCUMENTS

| | | | | |
|---|---|---|---|---|
| CN | 110876185 | A | 3/2020 | |
| EP | 4203603 | A1 | 6/2023 | |
| WO | 2020263842 | A1 | 12/2020 | |
| WO | WO-2022067733 | A1 * | 4/2022 | H04W 76/23 |
| WO | WO-2023000201 | A1 * | 1/2023 | H04W 72/232 |
| WO | WO-2023121530 | A1 * | 6/2023 | H04W 24/08 |

OTHER PUBLICATIONS

Zte, Sanechips: "On Capacity and Power Working Areas for XR", 3GPP TSG RAN WG1 #106-e, e-Meeting, Aug. 16-27, 2021, R1-2106529, total 10 pages.

* cited by examiner

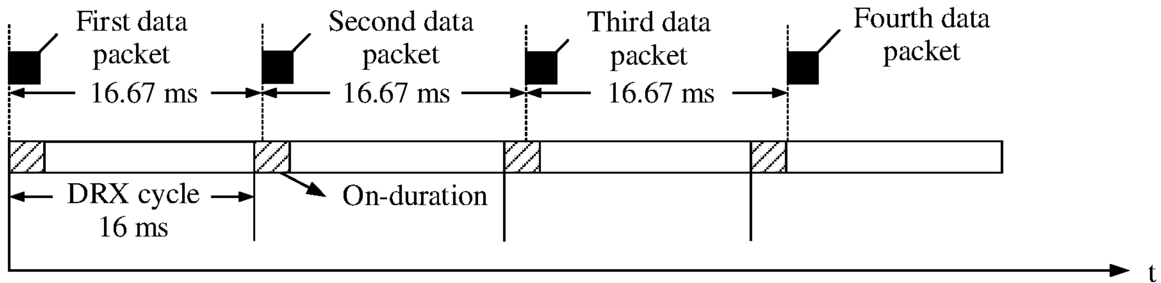

FIG. 3a 16.67 ms
16.67 ms
16.67 ms
Delay due to jitter
DRX cycle 16 ms
On-duration
t
Ideal arrival time of a data packet
Actual arrival time of a data packet after jitter

FIG. 3b

Network device
Terminal device
401: Send DRX configuration information to the terminal device
402: Receive the DRX configuration information from the network device, determine a start location of first on-duration and a start location of second on-duration based on the DRX configuration information, and receive a downlink signal within the first on-duration and the second on-duration

Delay due to jitter

On-duration

Inactivity timer t

Ideal arrival time of a data packet

Actual arrival time of a data packet after jitter

On-duration time period of a DRX cycle on a terminal device side

Running time of an inactivity timer of a terminal device

DISCONTINUOUS RECEPTION CONFIGURATION METHOD AND APPARATUS

CROSS-REFERENCE TO RELATED APPLICATIONS

This application is a continuation of International Application No. PCT/CN2022/087464, filed on Apr. 18, 2022, which claims priority to Chinese Patent Application No. 202110427057.X, filed on Apr. 20, 2021 and Chinese Patent Application No. 202110502448.3, filed on May 8, 2021. The disclosures of the aforementioned applications are hereby incorporated by reference in their entireties.

TECHNICAL FIELD

This application relates to the field of communication technologies, and in particular, to a discontinuous reception configuration method and an apparatus.

BACKGROUND

In a wireless communication system, to reduce power consumption of a terminal device while ensuring that data can be effectively transmitted, a discontinuous reception (DRX) mechanism is introduced to control the terminal device to monitor behavior of a physical downlink control channel (PDCCH). A network device delivers a DRX configuration to the terminal device, where the DRX configuration may include configuration information of a DRX cycle and configuration information of onDuration, and is used to determine that the terminal device can continuously monitor the PDCCH in an onDuration time period of the DRX cycle to obtain scheduling information. If the terminal device does not receive any scheduling information within the onDuration time period, the terminal device enters a sleep state, and stops monitoring the PDCCH to reduce power consumption.

An extended reality (XR) service, for example, virtual reality (VR), augmented reality (AR), and cloud gaming (CG) features a large data amount, and data packets of the XR service arrive periodically at a short interval. Therefore, the XR service usually has a high requirement on a transmission delay not less than 10 ms. Otherwise, user experience is affected.

For example, an XR service transmits 60 frames of images per second, that is, an average arrival time interval between data packets corresponding to two adjacent frames of images is 16.67 ms. Regardless of which DRX cycle length in the existing standard is used, for example, the existing DRX cycle is 12 ms, 14 ms, 16 ms, or 20 ms, a DRX cycle cannot be aligned with an arrival time interval between data packets. Therefore, arrival time of a data packet of an XR service is gradually offset from an onDuration time period configured in the DRX cycle, so that the arrival time of the data packet is beyond the onDuration time period of the DRX cycle. In this case, a terminal device is in sleep time and stops monitoring a PDCCH, and a network device needs to transmit the data packet in a next DRX cycle. This increases a transmission delay of the data packet, results in image freezing on a terminal device side, and affects user experience of the XR service. In addition, when the average arrival time interval between the data packets is 16.67 ms, and is not an integer multiple of a slot length (for example, 1 ms, 0.5 ms, or 0.25 ms), the data packet arrival time cannot be aligned with a slot boundary. As a result, the onDuration time period cannot be aligned with the data packet arrival time.

SUMMARY

This application provides a discontinuous reception configuration method and an apparatus, to resolve a problem in the conventional technology that data frame arrival time does not match an onDuration time period of a DRX cycle, and reduce power consumption of a terminal device while ensuring a data transmission delay.

To achieve the foregoing objective, this application uses the following technical solutions.

According to a first aspect, a discontinuous reception configuration method is provided, applied to a terminal device, and the method includes: receiving discontinuous reception DRX configuration information from a network device, where the DRX configuration information includes at least configuration information of a first DRX, and the configuration information of the first DRX includes a cycle length of the first DRX; and determining, based on the DRX configuration information, to receive a downlink signal within at least first onDuration and second onDuration, where the second onDuration is next onDuration of the first onDuration, and a time interval between a start location of the first onDuration and a start location of the second onDuration is greater than the cycle length of the first DRX.

In the foregoing technical solution, the network device may flexibly configure corresponding DRX configuration information for the terminal device, so that an onDuration time period of a DRX cycle matches or approximately matches data packet arrival time as much as possible. Therefore, a data transmission delay can be reduced, and user experience can be ensured while saving energy for the terminal device.

With reference to the first aspect, in a first possible implementation, the DRX configuration information further includes configuration information of a second DRX and a DRX pattern, where the configuration information of the second DRX includes a cycle length of the second DRX, and the DRX pattern indicates an order of at least one first DRX and at least one second DRX.

In the foregoing possible implementation, the network device may configure a large number of DRXs of different cycle lengths for the terminal device, and configure combination patterns corresponding to the DRXs of different cycle lengths, so that an onDuration time period determined by the terminal device can match data packet arrival time as much as possible. Therefore, a data transmission delay can be reduced while saving energy.

With reference to the first aspect and the first possible implementation of the first aspect, in a second possible implementation, the time interval between the start location of the first onDuration and the start location of the second onDuration is equal to the cycle length of the second DRX.

In the foregoing possible implementation, the network device configures DRXs of two different cycle lengths for the terminal device, and configures corresponding DRX patterns, so that the terminal device can calculate, based on a preconfigured algorithm, a system frame number (SFN) and a subframe number that correspond to a start location of a DRX cycle. In this way, an onDuration time period of the DRX cycle of the terminal device can match data packet arrival time, thereby reducing a data transmission delay while saving energy.

With reference to the first aspect, in a third possible implementation, the DRX configuration information further includes a first offset value, and the first offset value is used to determine the start location of the second onDuration; and the time interval between the start location of the first onDuration and the start location of the second onDuration is determined based on the cycle length of the first DRX and the first offset value.

In the foregoing possible implementation, the network device may configure an offset value of start time of a DRX cycle for the terminal device, so that the terminal device determines, based on the first offset value, a start location of onDuration in the DRX cycle. In this way, an onDuration time period of the DRX cycle of the terminal device can match data packet arrival time as much as possible, thereby reducing a data transmission delay while saving energy.

With reference to the third possible implementation of the first aspect, in a fourth possible implementation, the time interval between the start location of the first onDuration and the start location of the second onDuration is equal to a sum of the cycle length of the first DRX and the first offset value.

In the foregoing possible implementation, the terminal device may determine the time interval between the start location of the first onDuration and the start location of the second onDuration based on the sum of the cycle length of the first DRX and the first offset value, that is, determine the start location of the second onDuration. In this way, a start location of onDuration in a DRX cycle is adjusted by using the first offset value, so that a start location of onDuration of a next DRX cycle may match or basically match data packet arrival time, to avoid an excessively long data transmission delay.

With reference to the first aspect, in a fifth possible implementation, the time interval between the start location of the first onDuration and the start location of the second onDuration is determined based on the cycle length of the first DRX and a second offset value, and the second offset value is determined based on at least an index value of a DRX cycle in which the second onDuration is located.

In the foregoing possible implementation, a start location of onDuration in a DRX cycle is dynamically adjusted by using the second offset value, so that a start location of onDuration of a next DRX cycle may match or basically match data packet arrival time, to avoid an excessively long data transmission delay.

With reference to the fifth possible implementation of the first aspect, in a sixth possible implementation, the time interval between the start location of the first onDuration and the start location of the second onDuration is equal to a sum of the cycle length of the first DRX and the second offset value.

In the foregoing possible implementation, the terminal device may determine the start location of the second onDuration based on the sum of the cycle length of the first DRX and the second offset value, so that a start location of onDuration in a DRX cycle is adjusted by using the second offset value. In this way, a start location of a next DRX cycle may match or basically match data packet arrival time, thereby improving DRX configuration flexibility and saving energy.

With reference to the fifth possible implementation of the first aspect and the sixth possible implementation of the first aspect, in a seventh possible implementation, the second offset value f2 satisfies: $f2=\text{floor}(D\times n)-\text{floor}(D\times(n-1))$, where a floor(x) function is used to round down a parameter x, n is the index value of the DRX cycle in which the second onDuration is located, and D is determined based on first configuration information.

In the foregoing possible implementation, the terminal device may calculate the second offset value by using the foregoing algorithm, and further determine a start location of each DRX cycle based on a configured algorithm, so that the start location of the DRX cycle may gradually match or basically match data packet arrival time, thereby improving DRX configuration flexibility and saving energy.

With reference to the fifth possible implementation, the sixth possible implementation, and the seventh possible implementation of the first aspect, in an eighth possible implementation, the time interval between the start location of the first onDuration and the start location of the second onDuration is further determined based on a third offset value.

In the foregoing possible implementation, a start location of onDuration in a DRX cycle is dynamically adjusted by using the third offset value, so that the start location of the onDuration in the DRX cycle may gradually match or basically match data packet arrival time, thereby improving DRX configuration flexibility and saving energy.

With reference to the eighth possible implementation of the first aspect, in a ninth possible implementation, the time interval between the start location of the first onDuration and the start location of the second onDuration is equal to a sum of the cycle length of the first DRX, the second offset value, the third offset value, and drx-SlotOffset, and drx-SlotOffset is an offset value that is configured by the network device and that is used to determine a start location of onDuration.

In the foregoing possible implementation, the terminal device may determine a start location of each DRX cycle based on a configured algorithm and the third offset value, so that the start location of the DRX cycle may gradually match or basically match data packet arrival time, thereby improving DRX configuration flexibility and saving energy.

With reference to the eighth possible implementation and the ninth possible implementation of the first aspect, in a tenth possible implementation, the third offset value f3 satisfies:

$f3=\text{floor}(2^{\mu}\times(D\times n-\text{floor}(D\times n)))/2^{\mu}-\text{floor}\ (2^{\mu}\times(D\times(n-1)-\text{floor}(D\times(n-1))))/2^{\mu}$, where a floor(x) function is used to round down a parameter x, n represents an index value of a second DRX cycle, $\mu$ is a parameter corresponding to a subcarrier spacing, and D is determined based on the first configuration information.

In the foregoing possible implementation, the terminal device may calculate the third offset value by using the foregoing algorithm, and further determine a start location of each DRX cycle based on a configured algorithm, so that the start location of the DRX cycle may gradually match or basically match data packet arrival time, thereby improving DRX configuration flexibility and saving energy.

With reference to the seventh possible implementation and the tenth possible implementation of the first aspect, in an eleventh possible implementation, the method further includes: receiving the first configuration information from the network device, where the first configuration information includes a value of D, or the first configuration information includes data frame arrival time. The terminal device determines the value of D based on the data frame arrival time and the cycle length of the first DRX.

In the foregoing possible implementation, the network device may configure the value of D for the terminal device, or calculate a parameter of D, for example, the data frame arrival time, so that the terminal device may determine the second offset value or the third offset value based on the value of D, to further obtain a start location of each DRX cycle. This improves DRX configuration flexibility and saves energy.

According to a second aspect, a discontinuous reception configuration method is provided, applied to a network device, and the method includes: sending discontinuous reception DRX configuration information to a terminal device, where the DRX configuration information includes at least configuration information of a first DRX, and the configuration information of the first DRX includes a cycle length of the first DRX; and the DRX configuration information is used by the terminal device to determine to receive a downlink signal within at least first onDuration and second onDuration, where the second onDuration is next onDuration of the first onDuration, and a time interval between a start location of the first onDuration and a start location of the second onDuration is greater than the cycle length of the first DRX.

With reference to the second aspect, in a first possible implementation, the DRX configuration information further includes configuration information of a second DRX and a DRX pattern, the configuration information of the second DRX includes a cycle length of the second DRX, and the DRX pattern indicates an order of at least one first DRX and at least one second DRX.

With reference to the second aspect and the first possible implementation of the second aspect, in a second possible implementation, the time interval between the start location of the first onDuration and the start location of the second onDuration is equal to the cycle length of the second DRX.

With reference to the second aspect, in a third possible implementation, the DRX configuration information further includes a first offset value, and the first offset value is used to determine the start location of the second onDuration; and the time interval between the start location of the first onDuration and the start location of the second onDuration is determined based on the cycle length of the first DRX and the first offset value.

With reference to the third possible implementation of the second aspect, in a fourth possible implementation, the time interval between the start location of the first onDuration and the start location of the second onDuration is equal to a sum of the cycle length of the first DRX and the first offset value.

With reference to the second aspect, in a fifth possible implementation, the time interval between the start location of the first onDuration and the start location of the second onDuration is determined based on the cycle length of the first DRX and a second offset value, and the second offset value is determined based on at least an index value of a DRX cycle in which the second onDuration is located.

With reference to the fifth possible implementation of the second aspect, in a sixth possible implementation, the time interval between the start location of the first onDuration and the start location of the second onDuration is equal to a sum of the cycle length of the first DRX and the second offset value.

With reference to the fifth possible implementation and the sixth possible implementation of the second aspect, in a seventh possible implementation, the second offset value f2 satisfies: $f2=\text{floor}(D\times n)-\text{floor}(D\times(n-1))$, where a floor(x) function is used to round down a parameter x, n is the index value of the DRX cycle in which the second onDuration is located, and D is determined based on first configuration information.

With reference to the fifth possible implementation, the sixth possible implementation, and the seventh possible implementation of the second aspect, in an eighth possible implementation, the time interval between the start location of the first onDuration and the start location of the second onDuration is further determined based on a third offset value.

With reference to the eighth possible implementation of the second aspect, in a ninth possible implementation, the time interval between the start location of the first onDuration and the start location of the second onDuration is equal to a sum of the cycle length of the first DRX, the second offset value, the third offset value, and drx-SlotOffset, and drx-SlotOffset is an offset value that is configured by the network device and that is used to determine a start location of onDuration.

With reference to the eighth possible implementation and the ninth possible implementation of the second aspect, in a tenth possible implementation, the third offset value f3 satisfies:

$f3=\text{floor}(2^{\mu}\times(D\times n-\text{floor}(D\times n)))/2^{\mu}-\text{floor}\ (2^{\mu}\times(D\times(n-1)-\text{floor}(D\times(n-1))))/2^{\mu}$, where a floor(x) function is used to round down a parameter x, n represents an index value of a second DRX cycle, μ is a parameter corresponding to a subcarrier spacing, and D is determined based on the first configuration information.

With reference to the seventh possible implementation and the tenth possible implementation of the second aspect, in an eleventh possible implementation, the method further includes: sending the first configuration information to the terminal device, where the first configuration information includes a value of D, or the first configuration information includes data frame arrival time, so that the terminal device determines the value of D based on the data frame arrival time and the cycle length of the first DRX.

According to a third aspect, a discontinuous reception configuration method is provided, applied to a terminal device, and the method includes: receiving first indication information from a network device; and determining, based on the first indication information, a location at which a physical downlink control channel PDCCH is monitored within first onDuration, where the first indication information is located before the first onDuration, or the first indication information is located at a start location of the first onDuration.

In the foregoing technical solution, the network device may send, to the terminal device, the first indication information for monitoring the PDCCH, to shorten a time length for which the terminal device monitors the PDCCH, and reduce power consumption of the terminal device.

With reference to the third aspect, in a first possible implementation, the first indication information indicates a start location at which the terminal device monitors the PDCCH within the first onDuration.

In the foregoing possible implementation, the network device may indicate, to the terminal device, the start location at which the PDCCH is monitored, so that the terminal device starts to monitor the PDCCH based on the indicated location. This reduces a time length of invalid PDCCH monitoring, and reduces power consumption of the terminal device.

With reference to the first possible implementation of the third aspect, in a second possible implementation, the first indication information further indicates a time length for monitoring the PDCCH within the first onDuration.

In the foregoing possible implementation, in addition to indicating, to the terminal device, the start location at which the PDCCH is monitored, the network device may further indicate, to the terminal device, the duration for monitoring the PDCCH, so that the terminal device may determine a location and duration for monitoring the PDCCH based on the start location and the duration that are indicated by the network device. This reduces a time length of invalid PDCCH monitoring, and reduces power consumption of the terminal device.

With reference to the third aspect, in a third possible implementation, the first indication information indicates the terminal device to monitor the PDCCH in N areas of M areas in the first onDuration, where the first onDuration is divided into the M areas, M≥2, and N satisfies: 1≤N≤M.

In the foregoing possible implementation, partitioning indication may be performed on an onDuration time period through the first indication information, so that the terminal device may monitor the PDCCH only in some areas of the onDuration time period. This reduces a time length of invalid PDCCH monitoring, and reduces power consumption of the terminal device.

With reference to the third possible implementation of the third aspect, in a fourth possible implementation, after the receiving first indication information, the method further includes: receiving second indication information from the network device, where the second indication information indicates locations for monitoring the PDCCH in the N areas; and determining, based on the second indication information, a time period for monitoring the PDCCH.

In the foregoing possible implementation, the terminal device may further determine, through the second indication information, a start location at which the PDCCH is monitored in an onDuration time period, so that the terminal device may monitor the PDCCH only in a specified area of the onDuration time period. This reduces a time length of invalid PDCCH monitoring, and reduces power consumption of the terminal device.

With reference to the fourth possible implementation of the third aspect, in a fifth possible implementation, if the first indication information indicates to monitor the PDCCH in a first area in the first onDuration, the second indication information indicates to monitor the PDCCH in a first sub-area in the first area.

In the foregoing possible implementation, partitioning indication may be performed on an onDuration time period through the second indication information, so that the terminal device may monitor the PDCCH only in a specified area of the onDuration time period. This reduces a time length of invalid PDCCH monitoring, and reduces power consumption of the terminal device.

With reference to any possible implementation of the third aspect, in a sixth possible implementation, the first indication information and/or the second indication information are/is carried in at least one bit of downlink control signaling DCI.

In the foregoing possible implementation, the network device may shorten, through the first indication information, at least half time for monitoring the PDCCH by the terminal device, and may control a data transmission delay within 0.5×onDuration. Low signaling overheads are used to shorten a time length for which the terminal device monitors the PDCCH and reduce power consumption of the terminal device.

According to a fourth aspect, a discontinuous reception configuration method is provided, applied to a network device, and the method includes: determining first indication information, where the first indication information indicates a location at which a terminal device monitors a physical downlink control channel PDCCH within first onDuration; and sending the first indication information to the terminal device, where the first indication information is located before the first onDuration, or the first indication information is located at a start location of the first onDuration.

With reference to the fourth aspect, in a first possible implementation, that the first indication information indicates a location at which a terminal device monitors a PDCCH within first onDuration specifically includes: The first indication information indicates a start location at which the terminal device monitors the PDCCH within the first onDuration.

With reference to the first possible implementation of the fourth aspect, in a second possible implementation, the first indication information further indicates a time length for which the terminal device monitors the PDCCH within the first onDuration.

With reference to the fourth aspect, in a third possible implementation, the first indication information indicates the terminal device to monitor the PDCCH in N areas of M areas in the first onDuration, where the first onDuration is divided into the M areas, M≥2, and N satisfies: 1≤N≤M.

With reference to the third possible implementation of the fourth aspect, in a fourth possible implementation, after the sending the first indication information to the terminal device, the method further includes: sending second indication information to the terminal device, where the second indication information indicates locations at which the terminal device monitors the PDCCH and that are in the N areas.

With reference to the fourth possible implementation of the fourth aspect, in a fifth possible implementation, if the first indication information indicates the terminal device to monitor the PDCCH in a first area in the first onDuration, the second indication information indicates the terminal device to monitor the PDCCH in a first sub-area in the first area.

With reference to any possible implementation of the fourth aspect, in a sixth possible implementation, the first indication information and/or the second indication information are/is carried in at least one bit of downlink control signaling DCI.

According to a fifth aspect, a discontinuous reception configuration method is provided, applied to a terminal device, and the method includes: receiving third indication information from a network device; and stopping monitoring a physical downlink control channel PDCCH at a first moment based on the third indication information, where the first moment is a moment before first onDuration ends.

In the foregoing technical solution, the network device configures, for the terminal device, an indication of stopping monitoring PDCCH, so that the terminal device can shorten a time length for invalid PDCCH monitoring within onDuration, and reduce power consumption of the terminal device.

With reference to the fifth aspect, in a first possible implementation, the first moment is a moment at which an inactivity timer InactivityTimer of the terminal device expires, or a moment after the InactivityTimer of the terminal device expires, and the InactivityTimer is determined based on a DRX configuration.

In the foregoing possible implementation, the terminal device may determine, based on a rule that is used for stopping monitoring the PDCCH and that is configured by the network device, to stop monitoring the PDCCH before the onDuration ends and when the InactivityTimer expires, and enter a sleep state in advance, to reduce power consumption of the terminal device.

With reference to the first possible implementation of the fifth aspect, in a second possible implementation, the third indication information indicates that after the Inactivity-Timer of the terminal device expires, an onDurationTimer of the terminal device stops running, where the onDuration-Timer is determined based on the DRX configuration.

In the foregoing possible implementation, the terminal device may determine, within onDuration of a DRX cycle, to stop monitoring the PDCCH after the InactivityTimer expires. That is, the terminal device stops monitoring the PDCCH in a subsequent time period of the original onDuration, and enters the sleep state in advance. This shortens a time length for continuously monitoring the PDCCH.

With reference to any possible implementation of the fifth aspect, in a third possible implementation, the third indication information includes time domain resource information of the first moment.

In the foregoing possible implementation, the network device may send the third indication information to the terminal device, to determine the time domain resource information of the first moment at which monitoring the PDCCH is stopped. In this case, the terminal device may determine, based on the third indication information, a location at which monitoring the PDCCH is stopped, to reduce power consumption.

With reference to any possible implementation of the fifth aspect, in a fourth possible implementation, the stopping monitoring a physical downlink control channel PDCCH at a first moment based on the third indication information specifically includes: indicating, based on the third indication information, to stop running the InactivityTimer and the onDurationTimer at the first moment.

In the foregoing possible implementation, the terminal device may stop running the InactivityTimer and the onDurationTimer based on the third indication information, to stop monitoring the PDCCH in advance. This reduces power consumption.

With reference to any possible implementation of the fifth aspect, in a fifth possible implementation, the third indication information is carried in at least one bit of downlink control signaling DCI.

In the foregoing possible implementation, the network device may shorten a time length for which the terminal device monitors the PDCCH, reduce power consumption of the terminal device, and improve DRX configuration flexibility through small signaling overheads.

According to a sixth aspect, a discontinuous reception configuration method is provided, applied to a network device, and the method includes: determining third indication information, where the third indication information indicates a terminal device to stop monitoring a physical downlink control channel PDCCH at a first moment, where the first moment is a moment before first onDuration ends; and sending the third indication information to the terminal device.

With reference to the sixth aspect, in a first possible implementation, the first moment is a moment at which an inactivity timer InactivityTimer of the terminal device expires, or a moment after the InactivityTimer of the terminal device expires, and the InactivityTimer is determined based on a DRX configuration.

With reference to the first possible implementation of the sixth aspect, in a second possible implementation, the third indication information indicates that after the Inactivity-Timer of the terminal device expires, an onDurationTimer of the terminal device stops running, where the onDuration-Timer is determined based on the DRX configuration.

With reference to any possible implementation of the sixth aspect, in a third possible implementation, the third indication information includes time domain resource information of the first moment.

With reference to any possible implementation of the sixth aspect, in a fourth possible implementation, that the third indication information indicates a terminal device to stop monitoring a physical downlink control channel PDCCH at a first moment specifically includes: The third indication information indicates the terminal device to stop running the InactivityTimer and the onDurationTimer at the first moment.

With reference to any possible implementation of the sixth aspect, in a fifth possible implementation, the third indication information is carried in at least one bit of downlink control signaling DCI.

According to a seventh aspect, a discontinuous reception configuration method is provided, applied to a terminal device, and the method includes: receiving fourth indication information from a network device; and starting or restarting an inactivity timer InactivityTimer based on the fourth indication information, where the fourth indication information is not used to schedule data transmission, or the fourth indication information indicates to monitor a PDCCH in a first time period, the first time period is a time period after first onDuration, the fourth indication information is located before or within the first onDuration, and the first onDuration is determined based on a DRX configuration.

In the foregoing technical solution, the network device may send the fourth indication information to the terminal device, so that the terminal device may start or restart the InactivityTimer, to prolong active time, monitor the PDCCH, and improve flexibility of a DRX mechanism configuration. Therefore, the network device may configure a short onDuration time period for the terminal device based on a feature of the VR service, to further reduce power consumption.

With reference to the seventh aspect, in a first possible implementation, the fourth indication information is carried in at least one bit of DCI.

In the foregoing possible implementation, the network device may shorten a time length for which the terminal device monitors the PDCCH, reduce power consumption of the terminal device, and improve DRX configuration flexibility through small signaling overheads.

According to an eighth aspect, a discontinuous reception configuration method is provided, applied to a network device, and the method includes: determining fourth indication information, where the fourth indication information indicates a terminal device to start or restart an inactivity timer InactivityTimer, the fourth indication information is not used to schedule data transmission, or the fourth indication information indicates the terminal device to monitor a PDCCH in a first time period, the first time period is a time period after first onDuration, the fourth indication information is located before or within the first onDuration, and the first onDuration is determined based on a DRX configuration; and sending the fourth indication information to the terminal device.

With reference to the eighth aspect, in a first possible implementation, the fourth indication information is carried in at least one bit of DCI.

According to a ninth aspect, this application further provides a communication apparatus. The communication apparatus may be a terminal device, and the communication apparatus has a function of implementing the terminal device in any one of the first aspect, the third aspect, the fifth aspect, or the seventh aspect. The function may be implemented by hardware, or may be implemented by hardware executing corresponding software. The hardware or the software includes one or more modules corresponding to the foregoing function.

In a possible design, a structure of the communication apparatus includes a transceiver unit and a processing unit. These units may perform corresponding functions of the terminal device in any one of the first aspect, the third aspect, the fifth aspect, or the seventh aspect. For details, refer to detailed descriptions in the method examples. Details are not described herein again.

In a possible design, a structure of the communication apparatus includes a transceiver and a processor, and optionally, further includes a memory. The transceiver is configured to send and receive data, and is configured to communicate and interact with another device in a communication system. The processor is configured to support the communication apparatus in performing a corresponding function of the terminal device in any one of the first aspect, the third aspect, the fifth aspect, or the seventh aspect. The memory is coupled to the processor, and stores program instructions and data that are necessary for the communication apparatus.

According to a tenth aspect, this application further provides a communication apparatus. The communication apparatus may be a network device, and the communication apparatus has a function of implementing the network device in any one of the second aspect, the fourth aspect, the sixth aspect, or the eighth aspect. The function may be implemented by hardware, or may be implemented by hardware executing corresponding software. The hardware or the software includes one or more modules corresponding to the foregoing function.

In a possible design, a structure of the communication apparatus includes a transceiver unit and a processing unit. These units may perform corresponding functions of the network device in any one of the second aspect, the fourth aspect, the sixth aspect, or the eighth aspect. For details, refer to detailed descriptions in the method examples. Details are not described herein again.

In a possible design, a structure of the communication apparatus includes a transceiver and a processor, and optionally, further includes a memory. The transceiver is configured to send and receive data, and is configured to communicate and interact with another device in a communication system. The processor is configured to support the communication apparatus in performing a corresponding function of the network device in any one of the second aspect, the fourth aspect, the sixth aspect, or the eighth aspect. The memory is coupled to the processor, and stores program instructions and data that are necessary for the communication apparatus.

According to an eleventh aspect, an embodiment of this application provides a communication system, and the communication system may include the terminal device and the network device mentioned above.

According to a twelfth aspect, an embodiment of this application provides a computer-readable storage medium, where the computer-readable storage medium stores program instructions, and when the program instructions are run on a computer, the computer is enabled to perform the method in any one of the first aspect to the eighth aspect and any one of the possible designs thereof. For example, the computer-readable storage medium may be any usable medium accessible to the computer. By way of example and not limitation, the computer-readable medium may include a non-transient computer-readable medium, a random access memory (RAM), a read-only memory (ROM), an electrically erasable programmable read-only memory (EEPROM), a CD-ROM or another optical disc storage, a magnetic disk storage medium or another magnetic storage device, or any other medium that can be used to carry or store expected program code in a form of an instruction or a data structure and can be accessed by the computer.

According to a thirteenth aspect, an embodiment of this application provides a computer program product including computer program code or instructions. When the computer program product runs on a computer, the computer is enabled to implement the method in any one of the first aspect to the eighth aspect and any one of the possible designs thereof.

According to a fourteenth aspect, this application further provides a chip, including a processor. The processor is coupled to a memory, and is configured to read and execute program instructions stored in the memory, to enable the chip to implement the method in any one of the first aspect to the eighth aspect and any one of the possible designs thereof.

According to a fifteenth aspect, a discontinuous reception configuration method is provided, applied to a network device, and the method includes: after determining an inactivity timer InactivityTimer corresponding to a terminal device expires, stopping sending a PDCCH, and/or stopping an onDurationTimer corresponding to the terminal device.

In the foregoing technical solution, the network device may maintain a DRX configuration corresponding to each terminal device, and when determining that an InactivityTimer of a terminal device expires, the network device may stop sending a PDCCH to the terminal device, and/or may stop an onDurationTimer corresponding to the terminal device. In this way, a DRX configuration maintained on a network device side is aligned with a DRX configuration on a terminal device side, thereby improving communication efficiency while ensuring energy-saving efficiency of the terminal device.

With reference to the fifteenth aspect, in a first possible implementation, the method further includes: determining second configuration information, where the second configuration information indicates the terminal device to stop monitoring the PDCCH and/or to stop the onDurationTimer of the terminal device when or after the inactivity timer InactivityTimer expires; and sending the second configuration information to the terminal device.

In the foregoing technical solution, the network device may send the second configuration information to the terminal device, to enable a rule for stopping monitoring the PDCCH on a terminal device side, that is, stopping monitoring the PDCCH when the InactivityTimer expires. Therefore, the terminal device may enter a sleep state in advance at a moment that is before an onDurationTimer expires and that is in a DRX cycle, to reduce power consumption.

With reference to the first possible implementation of the fifteenth aspect, in a second possible implementation, the terminal device stops monitoring the PDCCH when or after the InactivityTimer expires within onDuration of a DRX cycle, and/or stops the onDurationTimer of the terminal device.

According to a sixteenth aspect, a discontinuous reception configuration method is provided, applied to a terminal device, and the method includes: stopping monitoring a PDCCH when or after an inactivity timer InactivityTimer expires.

In the foregoing technical solution, the terminal device may stop, through pre-definition or a configuration of the network device, monitoring the PDCCH before an onDurationTimer expires in a DRX cycle and when or after the InactivityTimer expires in the DRX cycle, so that the terminal device may enter a sleep state in advance, to reduce power consumption.

With reference to the sixteenth aspect, in a first possible implementation, the method further includes: receiving second configuration information from a network device, where the second configuration information indicates the terminal device to stop monitoring the PDCCH when or after the inactivity timer InactivityTimer expires in onDuration of a DRX cycle.

In the foregoing technical solution, the terminal device receives the second configuration information sent by the network device, to enable a rule for stopping monitoring the PDCCH at a moment before the onDurationTimer expires in the DRX cycle, that is, stopping monitoring the PDCCH when the InactivityTimer expires. In this way, the terminal device may enter the sleep state in advance, to reduce power consumption.

With reference to the first possible implementation of the sixteenth aspect, in a second possible implementation, the stopping monitoring a PDCCH includes: stopping running of the onDurationTimer.

In the foregoing technical solution, the terminal device stops running of the onDurationTimer in advance at a moment before the onDurationTimer expires in the DRX cycle, to stop monitoring the PDCCH, so that the terminal device can enter the sleep state in advance, to reduce power consumption.

According to a seventeenth aspect, a discontinuous reception configuration method is provided, applied to a network device, and the method includes: when determining that an inactivity timer InactivityTimer corresponding to a terminal device expires and a hybrid automatic repeat request HARQ retransmission timer is running, stopping sending a PDCCH, and/or stopping an onDurationTimer corresponding to the terminal device.

In the foregoing technical solution, the network device may maintain a DRX configuration corresponding to each terminal device, and when determining that an InactivityTimer of a terminal device expires and a HARQ retransmission timer is running, the network device may stop sending the PDCCH to the terminal device, and/or stop an onDurationTimer corresponding to the terminal device. In this way, a DRX configuration maintained on a network device side is aligned with a DRX configuration on a terminal device side, thereby improving communication efficiency while ensuring energy-saving efficiency of the terminal device.

With reference to the seventeenth aspect, in a first possible implementation, the method further includes: determining third configuration information, where the third configuration information indicates whether the terminal device monitors the PDCCH within running time of the hybrid automatic repeat request HARQ retransmission timer and after the inactivity timer InactivityTimer expires; and sending the third configuration information to the terminal device.

In the foregoing technical solution, the network device may send the third configuration information to the terminal device, to enable a rule for stopping monitoring the PDCCH on a terminal device side, that is, whether to continue monitoring the PDCCH within the running time of the HARQ retransmission timer and when the InactivityTimer expires. Therefore, the terminal device may enter a sleep state according to the foregoing rule of stopping monitoring the PDCCH, to reduce power consumption.

With reference to the first possible implementation of the seventeenth aspect, in a second possible implementation, the third configuration information indicates the terminal device to stop monitoring the PDCCH within the running time of the hybrid automatic repeat request HARQ retransmission timer and after the inactivity timer InactivityTimer expires.

In the foregoing possible implementation, the network device sends the third configuration information to the terminal device, to enable the terminal device to stop monitoring the PDCCH within the running time of the HARQ retransmission timer and after the InactivityTimer expires. Therefore, the terminal device may stop monitoring the PDCCH in a subsequent time period of original onDuration, and enter the sleep state in advance. This shortens a time length for continuously monitoring the PDCCH, and reduces power consumption.

With reference to any possible implementation of the seventeenth aspect, in a third possible implementation, the third configuration information indicates the terminal device to monitor the PDCCH within the running time of the hybrid automatic repeat request HARQ retransmission timer and after the inactivity timer InactivityTimer expires.

In the foregoing possible implementation, the network device sends the third configuration information to the terminal device, to enable the terminal device to continue to monitor the PDCCH within the running time of the HARQ retransmission timer and after the InactivityTimer expires. In this way, the network device may quickly complete retransmission within the running time of the HARQ retransmission timer, thereby reducing a data transmission delay.

With reference to any possible implementation of the seventeenth aspect, in a fourth possible implementation, the method further includes: The network device stops sending the PDCCH when or after determining that the InactivityTimer corresponding to the terminal device expires, and/or stops the onDurationTimer corresponding to the terminal device.

With reference to any possible implementation of the seventeenth aspect, in a fifth possible implementation, the method further includes: determining second configuration information, where the second configuration information indicates the terminal device to stop monitoring the PDCCH and/or stop the onDurationTimer of the terminal device when or after the inactivity timer InactivityTimer expires; and sending the second configuration information to the terminal device.

With reference to the fifth possible implementation of the seventeenth aspect, in a sixth possible implementation, the terminal device stops monitoring the PDCCH when or after the InactivityTimer expires within onDuration of the DRX cycle, and/or stops the onDurationTimer of the terminal device.

According to an eighteenth aspect, a discontinuous reception configuration method is provided, applied to a terminal device, and the method includes: When or after an inactivity timer InactivityTimer expires, the terminal device monitors a PDCCH within running time of a hybrid automatic repeat request HARQ retransmission timer.

Alternatively, when or after the inactivity timer InactivityTimer expires, the terminal device stops monitoring the PDCCH within the running time of the hybrid automatic repeat request HARQ retransmission timer.

In the foregoing technical solution, the terminal device may stop, through pre-definition or a configuration of a network device, monitoring the PDCCH within the running time of the HARQ retransmission timer and when or after the InactivityTimer expires, so that the terminal device may enter the sleep state in advance, to reduce power consumption. Alternatively, the terminal device may continue, through pre-definition or preconfiguration, to monitor the PDCCH within the running time of the HARQ retransmission timer and when or after the InactivityTimer expires. In this way, if transmission of an uplink data packet or a downlink data packet fails, and retransmission is needed, retransmission may be completed quickly within the running time of the HARQ retransmission timer, thereby reducing a data transmission delay.

With reference to the eighteenth aspect, in a first possible implementation, the method further includes: receiving third configuration information from the network device, where the third configuration information indicates whether the terminal device monitors the PDCCH within the running time of the hybrid automatic repeat request HARQ retransmission timer and after the inactivity timer InactivityTimer expires.

In the foregoing technical solution, the terminal device receives the third configuration information from the network device, to enable a rule for stopping monitoring the PDCCH on a terminal device side, that is, whether to continue monitoring the PDCCH within the running time of the HARQ retransmission timer and when the InactivityTimer expires. Therefore, the terminal device may enter the sleep state according to the foregoing rule of stopping monitoring the PDCCH, to reduce power consumption.

With reference to the first possible implementation of the eighteenth aspect, in a second possible implementation, the third configuration information indicates the terminal device to stop monitoring the PDCCH within the running time of the hybrid automatic repeat request HARQ retransmission timer and after the inactivity timer InactivityTimer expires.

With reference to any possible implementation of the eighteenth aspect, in a third possible implementation, the third configuration information indicates the terminal device to stop monitoring the PDCCH within the running time of the hybrid automatic repeat request HARQ retransmission timer and after the inactivity timer InactivityTimer expires.

With reference to any possible implementation of the eighteenth aspect, in a fourth possible implementation, when or after the inactivity timer InactivityTimer expires, monitoring the PDCCH is stopped.

With reference to any possible implementation of the eighteenth aspect, in a fifth possible implementation, second configuration information from the network device is received, where the second configuration information indicates the terminal device to stop monitoring the PDCCH when or after the inactivity timer InactivityTimer expires.

With reference to the fifth possible implementation of the eighteenth aspect, in a sixth possible implementation, the terminal device stops monitoring the PDCCH when or after the InactivityTimer expires within onDuration of a DRX cycle.

With reference to any possible implementation of the eighteenth aspect, in a seventh possible implementation, the stopping monitoring the PDCCH includes: stopping running of an onDurationTimer.

According to a nineteenth aspect, this application further provides a communication apparatus. The communication apparatus may be a network device, and the communication apparatus has a function of implementing the network device in any one of the fifteenth aspect or the seventeenth aspect. The function may be implemented by hardware, or may be implemented by hardware executing corresponding software. The hardware or the software includes one or more modules corresponding to the foregoing function.

In a possible design, a structure of the communication apparatus includes a transceiver unit and a processing unit. These units may perform corresponding functions of the network device in any one of the fifteenth aspect or the seventeenth aspect. For details, refer to detailed descriptions in the method examples. Details are not described herein again.

In a possible design, a structure of the communication apparatus includes a transceiver and a processor, and optionally, further includes a memory. The transceiver is configured to send and receive data, and is configured to communicate and interact with another device in a communication system. The processor is configured to support the communication apparatus in performing a corresponding function of the network device in any one of the fifteenth aspect or the seventeenth aspect. The memory is coupled to the processor, and stores program instructions and data that are necessary for the communication apparatus.

According to a twentieth aspect, this application further provides a communication apparatus. The communication apparatus may be a terminal device, and the communication apparatus has a function of implementing the network device in any one of the sixteenth aspect or the eighth aspect. The function may be implemented by hardware, or may be implemented by hardware executing corresponding software. The hardware or the software includes one or more modules corresponding to the foregoing function.

In a possible design, a structure of the communication apparatus includes a transceiver unit and a processing unit. These units may perform corresponding functions of the terminal device in any one of the sixteenth aspect or the eighth aspect. For details, refer to detailed descriptions in the method examples. Details are not described herein again.

In a possible design, a structure of the communication apparatus includes a transceiver and a processor, and optionally, further includes a memory. The transceiver is configured to send and receive data, and is configured to communicate and interact with another device in a communication system. The processor is configured to support the communication apparatus in performing a corresponding function of the terminal device according to any one of the sixteenth aspect or the eighteenth aspect. The memory is coupled to the processor, and stores program instructions and data that are necessary for the communication apparatus.

According to a twenty-first aspect, an embodiment of this application provides a communication system, and the communication system may include the terminal device and the network device mentioned above.

According to a twenty-second aspect, an embodiment of this application provides a computer-readable storage medium, where the computer-readable storage medium stores program instructions, and when the program instructions are run on a computer, the computer is enabled to perform the method in any one of the fifteenth aspect to the eighteenth aspect and any one of the possible designs thereof. For example, the computer-readable storage medium may be any usable medium accessible to the computer. By way of example and not limitation, the computer-readable medium may include a non-transient computer-readable medium, a random access memory (RAM), a read-only memory (ROM), an electrically erasable programmable read-only memory (EEPROM), a CD-ROM or another optical disc storage, a magnetic disk storage medium or another magnetic storage device, or any other medium that can be used to carry or store expected program code in a form of an instruction or a data structure and can be accessed by the computer.

According to a twenty-third aspect, an embodiment of this application provides a computer program product including computer program code or instructions. When the computer program product runs on a computer, the computer is enabled to implement the method in any one of the fifteenth aspect to the eighteenth aspect and any one of the possible designs thereof.

According to a twenty-fourth aspect, this application further provides a chip, including a processor. The processor is coupled to a memory, and is configured to read and execute program instructions stored in the memory, to enable the chip to implement the method in any one of the fifteenth aspect to the eighteenth aspect and any one of the possible designs thereof.

It may be understood that any discontinuous reception configuration apparatus, communication apparatus, computer-readable storage medium, computer program product, and communication—system provided in the ninth aspect to the fourteenth aspect and any one of the nineteenth aspect to the twenty-fourth aspect may be implemented by using a corresponding method provided above. Therefore, for beneficial effects that can be achieved, refer to the beneficial effect in the corresponding method provided above. Details are not described herein again.

BRIEF DESCRIPTION OF THE DRAWINGS

FIG. 3*a* and FIG. 3*b* each are a schematic diagram of a data packet scenario of an XR service or an XR-like service according to an embodiment of this application;

FIG. 4 is a schematic flowchart of a discontinuous reception configuration method according to an embodiment of this application;

DETAILED DESCRIPTION OF ILLUSTRATIVE EMBODIMENTS

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of embodiments, unless otherwise specified, "a plurality of" means two or more.

It should be noted that, in this application, terms such as "an example" or "for example" are used to indicate an example, an instance, or an illustration. Any embodiment or design scheme described as "an example" or "for example" in this application should not be explained as being more preferred or having more advantages than another embodiment or design scheme. Exactly, use of the word "example", "for example", or the like is intended to present a related concept in a specific manner.

The following clearly and completely describes the technical solutions in embodiments of this application with reference to the accompanying drawings in embodiments of this application. It is clear that the described embodiments are merely some but not all of embodiments of this application. All other embodiments obtained by a person of ordinary skill in the art based on embodiments of this application without creative efforts shall fall within the protection scope of this application.

First, an implementation environment and an application scenario of embodiments of this application are briefly described.

Figure 1A:
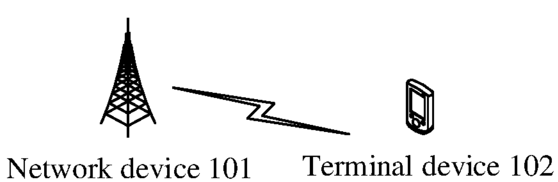
FIG. 1*a* is a diagram of a system architecture of a communication system according to an embodiment of this application.

This application may be applied to an existing new radio (NR) system, or may be applied to any other wireless communication system having a similar structure and function. As shown in FIG. 1*a*, the communication system includes at least a terminal device 101 and a network device 102.

The terminal device 101 in embodiments of this application may be user equipment (UE). The UE includes a handheld device, a vehicle-mounted device, a wearable device, or a computing device that has a wireless communication function. For example, the UE may be a mobile phone, a tablet computer, or a computer having a wireless transceiver function. Alternatively, the terminal device may be a virtual reality (VR) terminal device, an augmented reality (AR) terminal device, a wireless terminal in industrial control, a wireless terminal in self-driving, a wireless terminal in remote medical, a wireless terminal in a smart grid, a wireless terminal in a smart city, a wireless terminal in a smart home, or the like.

In embodiments of this application, an apparatus configured to implement a function of a terminal may be a terminal, or may be an apparatus, for example, a chip system, that can support a terminal in implementing the function, and the apparatus may be installed in the terminal. In embodiments of this application, the chip system may include a chip, or may include a chip and another discrete component. In the technical solutions provided in embodiments of this application, an example in which an apparatus configured to implement a function of a terminal device is UE is used to describe the technical solutions provided in embodiments of this application.

The network device 102 in embodiments of this application may include a base station (BS), and may be a device deployed in a radio access network and capable of performing wireless communication with a terminal.

The base station may be in a plurality of forms, for example, a macro base station, a micro base station, a relay station, and an access point. For example, the base station in embodiments of this application may be a base station in 5G or a base station in LTE. The base station in 5G may also be referred to as a transmission reception point (TRP) or a gNB.

In embodiments of this application, an apparatus configured to implement a function of a network device may be a network device, or may be an apparatus, for example, a chip system, that can support the network device in implementing the function, and the apparatus may be installed in the network device.

The technical solutions provided in embodiments of this application are described by using an example in which an apparatus configured to implement a function of a network device is a network device and the network device is a base station.

The technical solutions provided in embodiments of this application may be applied to wireless communication between a network device and a terminal device. In embodiments of this application, the term "wireless communication" may be referred to as "communication" for short, and the term "communication" may also be described as "data transmission", "information transmission", or "transmission".

It should be noted that FIG. 1*a* is merely an exemplary framework diagram, and a quantity of network element nodes included in FIG. 1*a* is not limited. In addition to functional nodes shown in FIG. 1*a*, another node may be included, for example, a core network device, a gateway device, and an application server. This is not limited. The access network device communicates with the core network device by using a wired network or a wireless network, for example, through a next generation (NG) interface.

Figure 2:
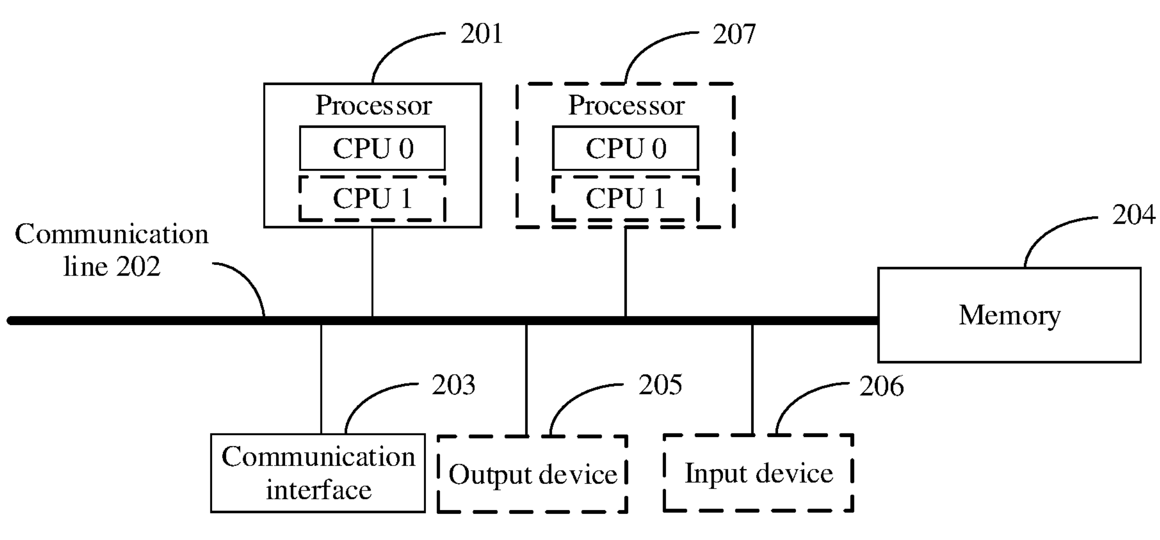
FIG. 2 is a diagram of an architecture of a communication apparatus according to an embodiment of this application.

During specific implementation, network elements shown in FIG. 1*a*, such as the terminal device and the network device, may use a composition structure shown in FIG. 2 or include components shown in FIG. 2. FIG. 2 is a schematic diagram of a structure of a communication apparatus 200 according to an embodiment of this application. When the communication apparatus 200 has a function of the terminal device in embodiments of this application, the communication apparatus 200 may be a terminal device, a chip in a terminal device, or a system on chip. When the communication apparatus 200 has a function of the network device described in embodiments of this application, the communication apparatus 200 may be a network device, a chip in a network device, or a system on chip.

As shown in FIG. 2, the communication apparatus 200 may include a processor 201, a communication line 202, and a communication interface 203. Further, the communication apparatus 200 may further include a memory 204. The processor 201, the memory 204, and the communication interface 203 may be connected to each other through the communication line 202.

The processor 201 may be a central processing unit (CPU), a general-purpose processor, a network processor (NP), a digital signal processor (DSP), a microprocessor, a microcontroller, a programmable logic device, or any combination thereof. The processor 201 may alternatively be another apparatus having a processing function, for example, a circuit, a component, or a software module.

The communication line 202 is configured to transmit information between components included in the communication apparatus 200.

The communication interface 203 is configured to communicate with another device or another communication network. The another communication network may be the Ethernet, a radio access network (RAN), a wireless local area network (WLAN), or the like. The communication interface 203 may be an interface circuit, a pin, a radio frequency module, a transceiver, or any apparatus that can implement communication.

The memory 204 is configured to store instructions. The instruction may be a computer program.

The memory 204 may be a read-only memory (ROM) or another type of static storage device that can store static information and/or instructions; may be a random access memory (RAM) or another type of dynamic storage device that can store information and/or instructions; or may be an electrically erasable programmable read-only memory (EEPROM), a compact disc read-only memory (CD-ROM) or another optical disc storage, an optical disc storage, a magnetic disk storage medium, or another magnetic storage device. The optical disc storage includes a compact optical disc, a laser disc, an optical disc, a digital versatile disc, a Blu-ray disc, or the like.

It should be noted that the memory 204 may exist independently of the processor 201, or may be integrated with the processor 201. The memory 204 may be configured to store instructions, program code, some data, or the like. The memory 204 may be located inside the communication apparatus 200, or may be located outside the communication apparatus 200. This is not limited. The processor 201 is configured to execute the instructions stored in the memory 204, to perform a method provided in the following embodiments of this application.

In an example, the processor 201 may include one or more CPUs, for example, a CPU 0 and a CPU 1 in FIG. 2.

In an optional implementation, the communication apparatus 200 includes a plurality of processors. For example, in addition to the processor 201 in FIG. 2, the communication apparatus 200 may further include a processor 207.

In an optional implementation, the communication apparatus 200 further includes an output device 205 and an input device 206. For example, the input device 206 is a device such as a keyboard, a mouse, a microphone, or a joystick, and the output device 205 is a device such as a display or a speaker.

It should be noted that the communication apparatus 200 may be a wearable device, a desktop computer, a portable computer, a network server, a mobile phone, a tablet computer, a wireless terminal, an embedded device, a chip system, or a device having a similar structure in FIG. 2. In addition, the composition structure shown in FIG. 2 does not constitute a limitation on the communication apparatus. In addition to the components shown in FIG. 2, the communication apparatus may include more or fewer components than components shown in the figure, combine some components, or have different component arrangements.

In this embodiment of this application, the chip system may include a chip, or may include a chip and another discrete component.

Figure 1B:
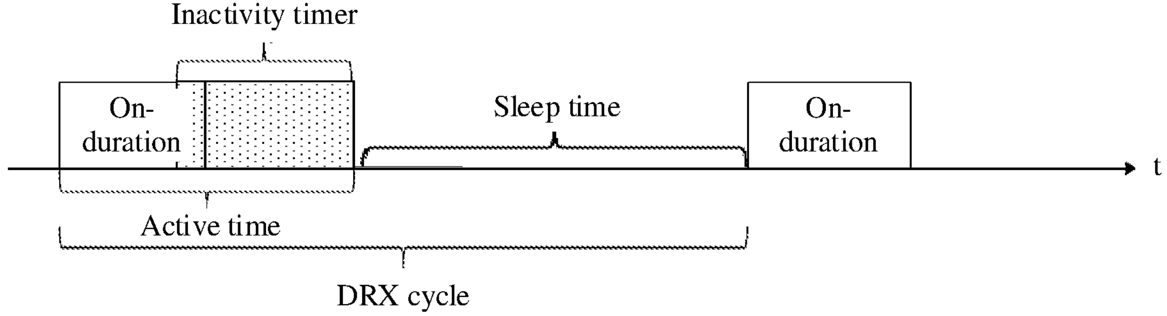
FIG. 1*b* is a schematic diagram of a DRX configuration of a terminal device according to an embodiment of this application.

With reference to FIG. 1*a*, when the terminal device is in a connected state, the terminal device may enter onDuration to continuously monitor a PDCCH based on DRX configuration information configured by the network device, or enter sleep time to stop monitoring the PDCCH to save power. As shown in FIG. 1*b*, the DRX configuration information may include a DRX cycle that is used to determine a cycle length of a DRX. The DRX configuration information may further include information indicating a start location of the DRX cycle, for example, drx-StartOffset that may be used to determine a start subframe of the DRX cycle. The DRX configuration information may further include configuration information of an onDurationTimer that is used to determine a time period in which the terminal device continuously monitors the PDCCH from the start location of the DRX cycle, that is, a quantity that is of consecutive subframes in which the PDCCH needs to be monitored and that is counted from the start subframe indicated by drx-StartOffset.

In addition, as shown in FIG. 1*b*, the terminal device may alternatively start or restart an inactivity timer Inactivity-Timer when monitoring a PDCCH for scheduling initially transmitted data, and the InactivityTimer is a timer used by the terminal device to prolong active time. The terminal device may determine, based on the InactivityTimer, a time length for which the terminal device is continuously in the active time after successfully decoding a PDCCH indicating uplink or downlink of the initially transmitted user data. In other words, the terminal device starts or restarts the timer InactivityTimer whenever the initially transmitted data is scheduled.

In a scenario in which the network device transmits a data packet of an XR or an XR-like service to the terminal device, as shown in FIG. 3*a*, that an average arrival time interval between data packets corresponding to two adjacent frames of images is 16.67 ms is used as an example, and an ideal arrival time interval between data packets on a terminal device side may be 16.67 ms.

In this case, the network device may configure, for the terminal device, a length that is of a DRX cycle and that is close to the arrival time interval between data packets, for example, may be 16 ms. As shown in FIG. 3*a*, an arrival moment of a first data packet falls within an onDuration time period of the DRX cycle. However, because an arrival time interval between the arrival moment of the first data packet and an arrival moment of a second data packet is 16.67 ms, a time distance between the arrival moment of the second data packet and a start moment of onDuration is different from a time distance between the arrival moment of the first data packet and a start moment of onDuration. After several data packets are transmitted, an arrival moment of a data packet may be beyond the onDuration time period of the DRX cycle. When the terminal device does not receive data scheduling within onDuration, the terminal device is in a state of not monitoring the PDCCH within a time period after the onDuration. In this case, the network device can only delay scheduling of the data packet to be performed in a next DRX cycle. The length of the DRX cycle is 16 ms, and scheduling is delayed to be performed in the next DRX cycle. Therefore, a delay of a data packet of the XR service on a terminal device side is greater than 10 ms, resulting in frame freezing, and severely affecting user experience of the XR service.

In addition, in NR, a plurality of different types of subcarrier spacings are supported, and each subcarrier spacing corresponds to a parameter μ. For example, when a subcarrier spacing is 15 kHz, corresponding μ is 0; and when a subcarrier spacing is 30 kHz, corresponding μ is 1. A slot length corresponding to each subcarrier spacing is $\frac{1}{2}^{\mu}$ ms, that is, the slot length may be 0.125 ms, 0.25 ms, 0.5 ms, 1 ms, or the like. When the average arrival time interval between data packets is 16.67 ms, and is not an integer multiple of the slot length, data packet arrival time cannot be aligned with a slot boundary. As a result, an onDuration time period cannot be aligned with the data packet arrival time.

In addition, in downlink transmission, because data packets arrive at a base station from a server through different routing paths, a jitter phenomenon may occur on actual arrival time of the data packets. For example, duration of jitter may be 0 ms to 8 ms. As shown in FIG. 3*b*, the arrival time of the data packets may be delayed by 0 ms to 8 ms, that is, an arrival time interval between the data packets fluctuates between 16.67 ms and 24.67 ms. As shown in FIG. 3*b*, an onDuration time period in the DRX cycle is set to be long, to resolve delayed arrival of a data packet caused by the jitter, and enable data arrival time to fall within the onDuration time period as much as possible. For example, a length of the onDuration is set to cover a possible delay range of the jitter, so that the length of the onDuration can cover all possible time periods in which data packets arrive. For example, the onDuration time period is set to 10 ms. However, if an onDuration time period of a DRX is set to be excessively long, the active time of the terminal device is excessively long. When the terminal device detects that the PDCCH is initially transmitted, the terminal device further starts the InactivityTimer to prolong the active time. In addition, transmission time period of each data packet may be short (for example, less than 5 ms). In this case, the terminal device performs invalid PDCCH monitoring in most time periods of the active time (that is, the PDCCH is monitored but no data scheduling is received), resulting in energy waste.

Based on the foregoing problem, the following describes implementations provided in embodiments of this application with reference to the communication system shown in FIG. 1*a*. Each device in the following embodiments may have the components shown in FIG. 2. Actions, terms, and the like in embodiments of this application may be mutually referenced. This is not limited. In embodiments of this application, names of messages exchanged between devices, names of parameters in the messages, or the like are merely examples. Other names may alternatively be used during specific implementation. This is not limited.

An embodiment of this application provides a discontinuous reception configuration method, applied to the communication system shown in FIG. 1*a*. As shown in FIG. 4, the method may include the following steps.

401: A network device sends DRX configuration information to a terminal device.

The DRX configuration information includes at least configuration information of at least one DRX. For example, the DRX configuration information may include configuration information of a first DRX, and the configuration information of the first DRX includes a cycle length of the first DRX.

Duration in which the terminal device monitors a PDCCH from a start location of a DRX and that is determined based on the DRX configuration information is also referred to as onDuration. OnDuration in a first DRX cycle may be first onDuration, and onDuration in a next first DRX cycle may be second onDuration. That is, the second onDuration is next onDuration of the first onDuration. A time interval between a start location of the first onDuration and a start location of the second onDuration is greater than the cycle length of the first DRX.

Alternatively, in another implementation, the DRX configuration information may further include configuration information of a second DRX, and the configuration information of the second DRX may include a cycle length of the second DRX.

It should be noted that a start location of a DRX cycle or a start location of onDuration in the DRX cycle in this embodiment of this application may be specifically a start slot, that is, a first slot at which the DRX cycle starts.

The onDuration in the first DRX cycle may be the second onDuration, the onDuration in the second DRX cycle may be the first onDuration, and the second onDuration is next onDuration of the first onDuration. The time interval between the start location of the first onDuration and the start location of the second onDuration is greater than the cycle length of the first DRX.

Further, the DRX configuration information may further include a DRX pattern. The DRX pattern indicates an arrangement order of at least one first DRX and at least one second DRX, or the DRX pattern indicates an arrangement order of at least one first DRX cycle and at least one second DRX cycle, or the DRX pattern indicates an arrangement order of the first DRX cycle and the second DRX cycle, a quantity of first DRX cycles, and a quantity of second DRX cycles. For example, the DRX pattern may indicate the following arrangement order: {the first DRX, the second DRX, the first DRX}, {the first DRX, the second DRX, the second DRX}, or the like.

Optionally, the DRX configuration information may be carried in radio resource control (RRC) signaling.

402: The terminal device receives the DRX configuration information from the network device, determines the start location of the first onDuration and the start location of the second onDuration based on the DRX configuration information, and receives a downlink signal within the first onDuration and the second onDuration.

The terminal device may start an onDuration timer at a start moment of the DRX cycle based on the DRX configuration information, and enter active time to continuously monitor the PDCCH until the onDuration timer expires. If the terminal device does not receive scheduling information, the terminal device enters inactive time; or if the terminal device obtains, through monitoring, the PDCCH within onDuration, the terminal device starts InactivityTimer to prolong the active time.

Specifically, the terminal device may determine a start location of the first DRX cycle and a start location of onDuration of the first DRX cycle based on parameters included in the DRX configuration information.

In the foregoing implementation, the terminal device may receive the downlink signal within an onDuration time period of at least one first DRX and onDuration of at least one second DRX based on the configuration information of the first DRX, the configuration information of the second DRX, and the DRX pattern.

Therefore, in the foregoing implementation of this application, the network device can flexibly configure a corresponding DRX for the terminal device based on a frame rate at which the terminal device transmits data, so that an onDuration time period of a DRX cycle matches data packet arrival time as much as possible, thereby reducing a data transmission delay, and saving energy for the terminal device while ensuring user experience.

In an implementation, the network device may configure DRXs of two different cycle lengths for the terminal device, and configure corresponding DRX patterns, so that the onDuration time period of the DRX cycle of the terminal device can match the data packet arrival time.

With reference to different data frame rates, a start location of each DRX cycle may be obtained based on an algorithm configured by the network device. If a data frame rate of a service is 1000/A fps (frame per second), that is, an arrival time interval between data packets is A ms, the network device may configure the cycle length of the first DRX to be B ms, where $B<A$, and configure the cycle length of the second DRX to be C ms, where $C>A$. A positive integer M and a positive integer N may be found, so that $M\times B+N\times C=(M+N)\times A$ is satisfied. In this case, the network device may configure the DRX pattern as {M first DRXs, N second DRXs}.

For example, a possible implementation of this application is described by using an example in which a data frame rate is 60 fps, that is, an arrival time interval between data packets is 16.67 ms.

The DRX configuration information sent by the network device to the terminal device includes: The cycle length of the first DRX is 16 ms, and the cycle length of the second DRX is 17 ms. Further, the DRX configuration information further includes the DRX pattern. For example, the DRX pattern may indicate an arrangement order: {the first DRX, the second DRX, the second DRX}.

Figure 5:
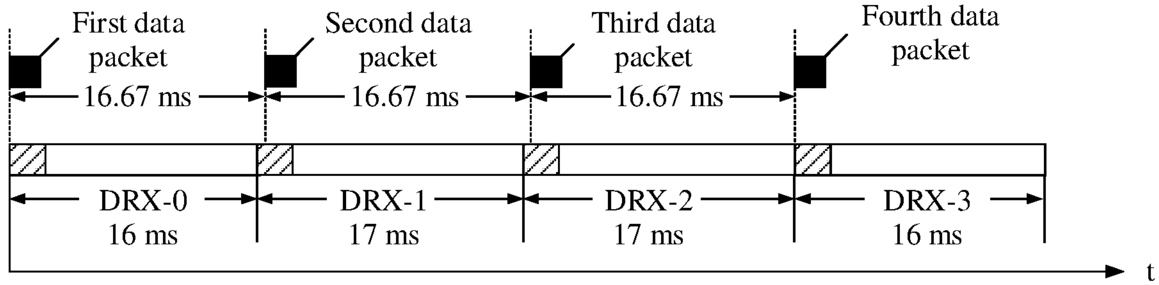
FIG. 5 to FIG. 8 each are a schematic diagram of a scenario of a discontinuous reception configuration method according to an embodiment of this application.

FIG. 5 shows a DRX configuration manner of the terminal device. A cycle length of a DRX-0 is 16 ms, a cycle length of a DRX-1 is 17 ms, a cycle length of a DRX-2 is 17 ms, a cycle length of a DRX-3 is 16 ms, and so on. A difference between a start location of the DRX-1 and arrival time of a second data packet is 0.67 ms, a difference between a start location of the DRX-2 and arrival time of a third data packet is reduced to 0.34 ms, and a start location of the DRX-3 matches data frame arrival time.

In the foregoing implementation, a length of a DRX cycle 1 and a length of a DRX cycle 2 are configured to be respectively 16 ms and 17 ms, and the two DRX cycles are arranged based on a specific arrangement order. For example, the two DRX cycles may be arranged as follows: the cycle 1—the cycle 2—the cycle 2, the cycle 2—the cycle 1—cycle 2, or the like, so that a difference between a start location of each DRX cycle and data packet arrival time may be less than or equal to 0.67 ms, thereby reducing a data transmission delay.

Specifically, the network device may preconfigure, for the terminal device, an algorithm for a start location drx-StartOffset of the DRX cycle, so that the terminal device may obtain, through calculation based on the algorithm, a system frame number (SFN) and a subframe number that correspond to the start location of the DRX cycle.

For example, the SFN and the subframe number that correspond to the start location of the DRX cycle satisfy the following algorithm.

1. If an index of the DRX cycle is a multiple of 3, that is, n mod 3=0, $$[(SFN\times 10)+\text{subframe number}]\bmod\left(\sum\nolimits_0^2 L_i\right)=drx-StartOffset.$$

2. If an index of the DRX cycle is not a multiple of 3, that is, n mod 3≠0, $$[(SFN\times 10)+\text{subframe number}]\bmod\left(\sum\nolimits_0^2 L_i\right)=drx-StartOffset+\sum\nolimits_0^{n\%3-1} L_i.$$

n represents the index of the DRX cycle, and a value of n may be an integer such as 0, 1, 2, 3, 4, or the like. subframe number represents the subframe number, and one SFN may include to subframes. $L_i$ represents a cycle length of an $i^{th}$ DRX cycle in a DRX pattern of a DRX configuration. In an implementation shown in FIG. 5 in this application, the DRX pattern of the DRX configuration includes three DRXs. Therefore, a value of i may be 0, 1, or 2. n % 3 represents a value obtained by using a remainder of n to 3.

For example, as shown in FIG. 5, $L_0$=16 ms, $L_1$=17 ms, and $L_2$=17 ms. Therefore, $$\sum_{0}^{2} L_i = 50 \text{ ms}.$$

A value of $$\sum_{0}^{n\%3-1} L_i$$

may be 16 ms or 33 ms.

Therefore, when n mod 3=0, that is, when a time point is at, for example, 0 ms, 50 ms, or 100 ms, the SFN and the subframe number that correspond to the start location of the DRX cycle are determined based on [(SFN×10)+subframe number] mod (50). When n mod 3≠0, that is, when a time moment is at, for example, 16 ms, 33 ms, 66 ms, 83 ms, or the like, the start location of the DRX-1 in FIG. 5 is equivalent to a location obtained by offsetting, by the cycle length of the DRX-0, the start location that is of the DRX cycle and that is determined based on [(SFN×10)+subframe number] mod (50), and the start location of the DRX-2 is equivalent to a location obtained by offsetting the start location of the DRX-1 by the cycle length of the DRX-1. An SFN and a subframe number that correspond to a start location of each DRX cycle may be determined by using this method.

An example in which a data frame rate of data is 90 fps, that is, an arrival time interval between data packets is 11.11 ms, is used for description. The DRX configuration information sent by the network device to the terminal device includes: The cycle length of the first DRX is 11 ms, and the cycle length of the second DRX is 12 ms. Further, the DRX configuration information further includes the DRX pattern. For example, the DRX pattern may indicate an arrangement order: {eight first DRXs, one second DRX}.

Similarly, cycle lengths of a DRX-0 to a DRX-7 are 11 ms, a cycle length of a DRX-8 is 12 ms, cycle lengths of a DRX-9 to a DRX-16 are 11 ms, and a cycle length of a DRX-17 is 12 ms, and so on. A difference between a start location of each DRX in the DRX-1 to the DRX-8 and data packet arrival time is 0.11 ms, 0.22 ms, . . . , 0.88 ms, and a start location of the DRX-9 matches data frame arrival time.

Specifically, the network device may preconfigure, for the terminal device, an algorithm for a start location drx-StartOffset of the DRX cycle, so that the terminal device may obtain, through calculation based on the algorithm, a system frame number (SFN) and a subframe number that correspond to the start location of the DRX cycle.

For example, the SFN and the subframe number that correspond to the start location of the DRX cycle satisfy the following algorithm.

1. If an index of the DRX cycle is a multiple of 9, that is, n mod 9=0, $$[(SFN \times 10) + \text{subframe number}] \bmod \left(\sum_{0}^{8} L_i\right) = drx - StartOffset.$$

2. If an index (index) of the DRX cycle is not a multiple of 9, that is, n mod 9≠0, $$[(SFN \times 10) + \text{subframe number}] \bmod \left(\sum_{0}^{8} L_i\right) = drx - StartOffset + \sum_{0}^{n\%9-1} L_i.$$

n represents the index of the DRX cycle, and a value of n may be an integer such as 0, 1, 2, 3, 4, or the like. subframe number represents the subframe number, and one SFN may include 10 subframes. $L_i$ represents a cycle length of an $i^{th}$ DRX cycle in a DRX pattern of a DRX configuration. In an implementation shown in FIG. 5 in this application, the DRX pattern of the DRX configuration includes nine DRXs. Therefore, a value of i may range from 0 to 8. n % 9 represents a value obtained by using a remainder of n to 9.

In another implementation, the DRX configuration information in the step 401 may further include a first offset value, and the first offset value may be used to determine the start location of the second onDuration. In other words, the network device may configure, for the terminal device, an offset value that is of a DRX and that is used to determine a start location of onDuration in a DRX cycle.

Further, the terminal device may determine the time interval between the start location of the first onDuration and the start location of the second onDuration based on the cycle length of the first DRX and the first offset value.

Specifically, when determining that a specific condition is met, the terminal device may determine the time interval between the start location of the first onDuration and the start location of the second onDuration based on a sum of the cycle length of the first DRX and the first offset value, that is, determine the start location of the second onDuration.

For example, an implementation of this application is described by using an example in which an arrival time interval between data packets is 16.67 ms and the cycle length of the first DRX is 16 ms. The first offset value f1 may be set to 2 ms, and the condition may be: determining whether an index of a DRX cycle is a multiple of 3.

When an index n of a DRX cycle is not a multiple of 3, an SFN and a subframe number that correspond to a start location of the DRX cycle satisfy:

$$[(SFN \times 10) + \text{subframe number}] \bmod (DRX\_Cycle) = drx\text{-StartOffset},$$

where DRX_Cycle is cycle length of a DRX.

When an index n of a DRX cycle is a multiple of 3, an SFN and a subframe number that correspond to a start location of the DRX cycle satisfy:

$$[(SFN \times 10) + \text{subframe number}] \bmod (DRX\_Cycle) = drx\text{-StartOffset} + f1.$$

Alternatively, in the foregoing implementation, an SFN and a subframe number that correspond to a start location of a DRX cycle are further determined in another manner:

$$[(SFN \times 10) + \text{subframe number}] \bmod (DRX\_Cycle) = drx\text{-StartOffset} + f1,$$

where when $n$ mod 3=0,$f1$=2 ms; and when $n$ mod 3≤0,$f1$=0.

The foregoing implementation shows a case in which the network device configures a DRX cycle for the terminal device. Further, when the network device configures a long DRX cycle drx-LongCycle and a short DRX cycle drx-ShortCycle for the terminal device, an SFN and a subframe number that correspond to a start location of a DRX cycle are as follows.

An SFN and a subframe number that correspond to a start location of the short DRX cycle satisfy:

$$[(SFN\times 10)+\text{subframe number}] \bmod (drx\text{-ShortCycle})=(drx\text{-StartOffset}+f1) \bmod (drx\text{-ShortCycle}).$$

An SFN and a subframe number that correspond to a start location of the long DRX cycle satisfy:

$$[(SFN\times 10)+\text{subframe number}] \bmod (drx\text{-LongCycle})=drx\text{-StartOffset}+f1,$$

where when $n \bmod 3=0, f1=2$ ms; and when $n \bmod 3\leq 0, f1=0$.

Figure 6:
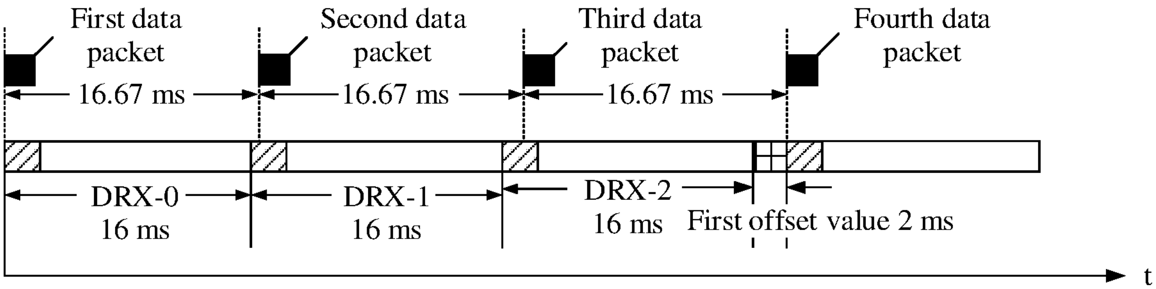

As shown in FIG. 6, the DRX cycle configured by the network device is 16 ms, the first offset value configured by the network device may be 2 ms, and a start location of onDuration of a fourth DRX cycle (that is, the DRX-3) may be offset by 2 ms by the terminal device, so that the onDuration of the fourth DRX cycle matches data packet arrival time.

In the foregoing implementation, the terminal device may adjust a start location of onDuration of a DRX cycle every three DRX cycles by using the first offset value, so that a start location of onDuration of a next DRX cycle may match or basically match data packet arrival time, to avoid an excessively long data transmission delay.

In addition, for another data transmission frame rate, for example, 30 fps or 90 fps, a start location of onDuration of a DRX cycle may also be adjusted by using the foregoing manner in which a specific first offset value is configured every N DRX cycles. In this way, every N DRX cycles, a start location of a DRX cycle may match or basically match data packet arrival time. The first offset value or N may be preconfigured by the network device for the terminal device, or the network device configures a corresponding algorithm for the terminal device, so that the terminal device may obtain a start location of each DRX cycle based on a preconfiguration.

For example, if a frame rate is 30 fps, that is, an arrival time interval between two data packets may be 33.33 ms, the network device may set the DRX cycle to 34 ms, so that the terminal device may adjust a start location of onDuration of the DRX cycle by configuring a specific first offset value every three DRX cycles. For example, f1=−2 ms, that is, a start location of a fourth DRX cycle is offset forward by 2 ms. In this way, the start location of the fourth DRX cycle approximately matches data packet arrival time.

Alternatively, the network device may set the DRX cycle to 33 ms, and the terminal device may adjust a start location of onDuration of the DRX cycle by configuring a specific first offset value every three DRX cycles. For example, f1=1 ms. That is, a start location of a fourth DRX cycle is offset backward by 1 ms. In this way, the start location of the fourth DRX cycle approximately matches data packet arrival time.

In another example, if a frame rate is 90 fps, that is, an arrival time interval between two data packets may be 11.11 ms, the network device may set the DRX cycle to 11 ms. The terminal device may adjust a start location of onDuration of the DRX cycle by configuring a specific first offset value every nine DRX cycles. For example, f1=1 ms, that is, a start location of a tenth DRX cycle is offset backward by 1 ms. In this way, the start location of the tenth DRX cycle approximately matches data packet arrival time.

In another implementation, the terminal device may further determine the time interval between the start location of the first onDuration and the start location of the second onDuration by using a second offset value. The second offset value may be carried in the DRX configuration information sent by the network device to the terminal device in the step 401, or may be configured by the network device for the terminal device through another configuration information. Therefore, the terminal device may determine the time interval between the start location of the first onDuration and the start location of the second onDuration based on the second offset value and the cycle length of the first DRX, to determine the start location of the second onDuration.

Further, the second offset value is determined based on at least an index value of a DRX cycle in which the second onDuration is located, and the time interval between the start location of the first onDuration and the start location of the second onDuration may be equal to a sum of the cycle length of the first DRX and the second offset value.

In an implementation, the second offset value f2 satisfies: $f2=\text{floor}(D\times n)-\text{floor}(D\times(n-1))$, where a floor(x) function is used to round down a parameter x, n is the index value of the DRX cycle in which the second onDuration is located, n−1 is an index value of a DRX cycle in which the first onDuration is located, and D may be determined based on first configuration information.

The first configuration information may be carried in the DRX configuration information in the step **40*i***, or may be carried in another configuration information (for example, another RRC signaling) delivered by the network device to the terminal device. This is not specifically limited in this application.

Specifically, D may be a difference between a length of a DRX cycle and a data packet arrival time interval, the first configuration information may include a value of D, or the first configuration information includes the data packet arrival time interval, so that the terminal device may obtain the value of D through calculation based on a difference between the data packet arrival time interval and the length of the DRX cycle included in the DRX configuration information. For example, when the data packet arrival time interval is 16.67 ms, and the length of the DRX is 16 ms, the value of D is 0.67 ms.

Further, that the terminal device determines a start location of each DRX cycle includes the following. An SFN and a subframe number that correspond to a start location of a short DRX cycle satisfy:

$$[(SFN\times 10)+\text{subframe number}] \bmod (drx\text{-ShortCycle})=(drx\text{-StartOffset}+f2\_1) \bmod (drx\text{-ShortCycle}).$$

An SFN and a subframe number that correspond to a start location of a long DRX cycle satisfy:

$$[(SFN\times 10)+\text{subframe number}] \bmod (drx\text{-LongCycle})=drx\text{-StartOffset}+f2\_1,$$

and $$f2\_1=\text{floor}(D\times n).$$

Figure 7:
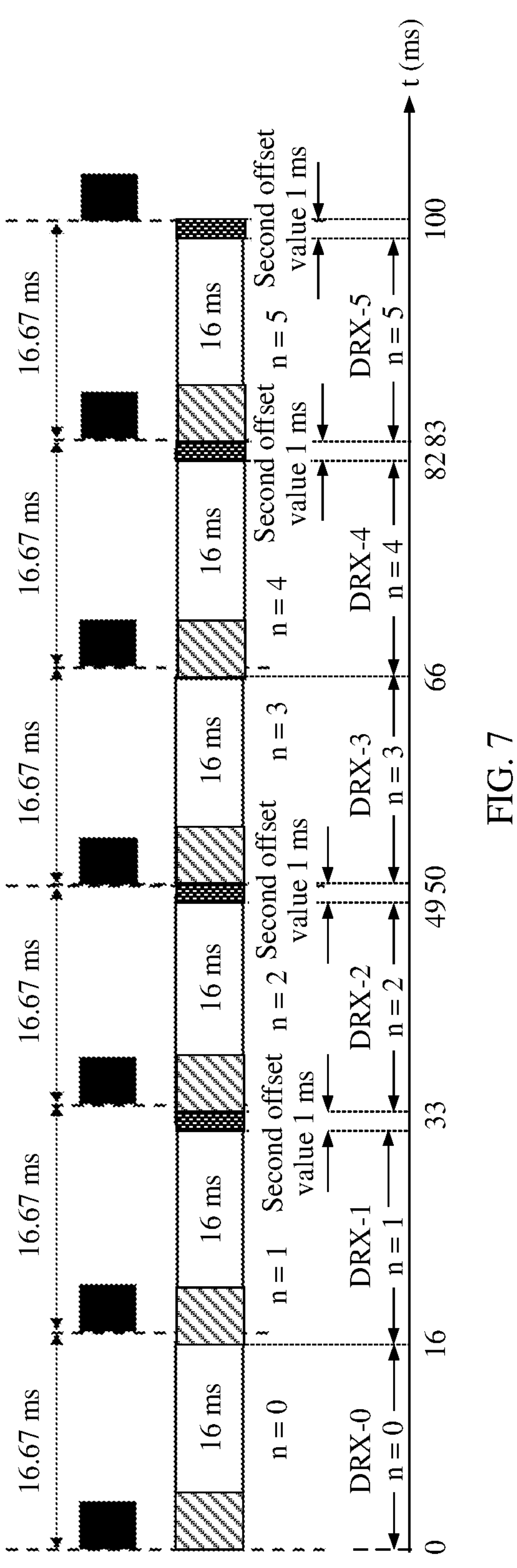

For example, as shown in FIG. 7, when n=0, 16×0+floor (0.67×0)=0, and a start location of a DRX-0 is at 0 ms. When n=1, 16×1+floor (0.67×1)=16, and a start location of a DRX-1 is at 16 ms. In this case, a time interval between the start location of the DRX-1 and the start location of the DRX-0 is 16 ms, and the time interval is the same as a DRX cycle length 16 ms. That is, f2=0 ms, and a total offset value f2_1 is 0 ms. When n=2, 16×2+floor (0.67×2)=33, and a start location of a DRX-2 is at 33 ms. In this case, a time interval between the start location of the DRX-2 and the start location of the DRX-1 is 17 ms. Compared with the DRX cycle length 16 ms, the start location of the DRX-2 is offset by 1 ms. That is, f2=1 ms, and the total offset value f2_1 is 1 ms. When n=3, 16×3+floor (0.67×3)=50, and a start location of a DRX-3 is at 50 ms. In this case, a time interval between the start location of the DRX-3 and the start location of the DRX-2 is 17 ms. Compared with the DRX cycle length 16 ms, the start location of the DRX-3 is offset by 1 ms. That is, f2=1 ms, and when the terminal device reaches the start location of the DRX-3, the total offset value f2_1 is 2 ms. When n=4, 16×4+floor (0.67×4)=66, and a start location of a DRX-4 is at 66 ms. In this case, a time interval between the start location of the DRX-4 and the start location of the DRX-3 is 16 ms, and the time interval is the same as the DRX cycle length 16 ms. That is, f2=0 ms, and the total offset value f2_1 is 2 ms. When n=5, 16×5+floor (0.67×5)=83, and a start location of a DRX-5 is at 83 ms. In this case, a time interval between the start location of the DRX-5 and the start location of the DRX-4 is 17 ms. Compared with the DRX cycle length 16 ms, the start location of the DRX-5 is offset by 1 ms. That is, f2=1 ms, and the total offset value f2_1 is 3 ms. It can be seen from the DRX configuration shown in the figure that the DRX-3 to the DRX-5 repeat corresponding configurations of the DRX-0 to the DRX-2, so that after every three DRX cycles, data packet arrival time may match or approximately match start time of a next DRX cycle.

In addition, the DRX configuration information configured by the network device for the terminal device may further include an offset value of a start location of onDuration, for example, drx-slotOffset, that is, a start location of a DRX cycle is not necessarily the start location of the onDuration. Instead, the start location of the DRX cycle should be the start location of the DRX cycle plus configured offset value drx-slotOffset. In this embodiment of this application, an offset value between a start location of a DRX cycle and a start location of onDuration may be dynamically adjusted, to adjust the start location of the onDuration in the DRX cycle, so that the start location of the onDuration in the DRX cycle matches data packet arrival time as much as possible.

In a possible implementation of this application, the time interval between the start location of the first onDuration and the start location of the second onDuration may alternatively be determined based on a third offset value.

Further, the terminal device may determine the time interval between the start location of the first onDuration and the start location of the second onDuration based on a sum of the cycle length of the first DRX, the second offset value, and the third offset value.

In other words, after determining a subframe corresponding to the start location of the second onDuration, the terminal device further determines, based on the third offset value, a specific location that is of the start location of the second onDuration and that is in the subframe. Specifically, a quantity of spaced subframes may be first determined based on the cycle length of the first DRX and the second offset value, and then, a final time interval between the start location of the first onDuration and the start location of the second onDuration may be determined based on a sum of the third offset value and drx-SlotOffset, where drx-SlotOffset is an offset value that is of a start location of onDuration and that is configured by the network device.

In an implementation, the third offset value f3 satisfies:

$$f3=\mathrm{floor}(2^{\mu}\times(D\times n-\mathrm{floor}(D\times n)))/2^{\mu}-\mathrm{floor}(2^{\mu}\times(D\times(n-1)-\mathrm{floor}(D\times(n-1))))/2^{\mu},$$

where a floor(x) function is used to round down a parameter x, n represents an index value of a second DRX cycle, and μ is a parameter corresponding to a subcarrier spacing. D may be determined based on the first configuration information. For details, refer to the foregoing implementation to obtain a value of D. Details are not described herein again.

In this case, the terminal device determines, according to the following formula, a target subframe in which onDuration is located.

An SFN and a subframe number that correspond to a start location of a short DRX cycle satisfy: [(SFN×10)+subframe number] mod (drx-ShortCycle)=(drx-StartOffset+f3_1) mod (drx-ShortCycle).

An SFN and a subframe number that correspond to a start location of a long DRX cycle satisfy: [(SFN×10)+subframe number] mod (Drx-LongCycle)=drx-StartOffset+f3_1.

The start location of the second onDuration is a location obtained by offsetting backward a start location of the target subframe by drx-SlotOffset+f3_1, where drx-SlotOffset is an offset value that is of a start location of onDuration and that is configured by the network device, and $f3\_1=\mathrm{floor}(2^{\mu}\times(D\times n-\mathrm{floor}(D\times n)))/2^{\mu}$.

Specifically, an example in which a data packet arrival time interval is 16.67 ms and a DRX cycle configured by the network device is 16 ms is still used for description. It is assumed that when μ-1 and drx-SlotOffset configured by the network device is 0, D=0.67. When n=0, f3_1=0 ms; when n=1, f3_1=0.5 ms; when n=2, f3_1=0 ms; when n=3, f3_1=0 ms; when n=4, f3_1=0.5 ms; when n=5, f3_1=0 ms; and so on.

Figure 8:
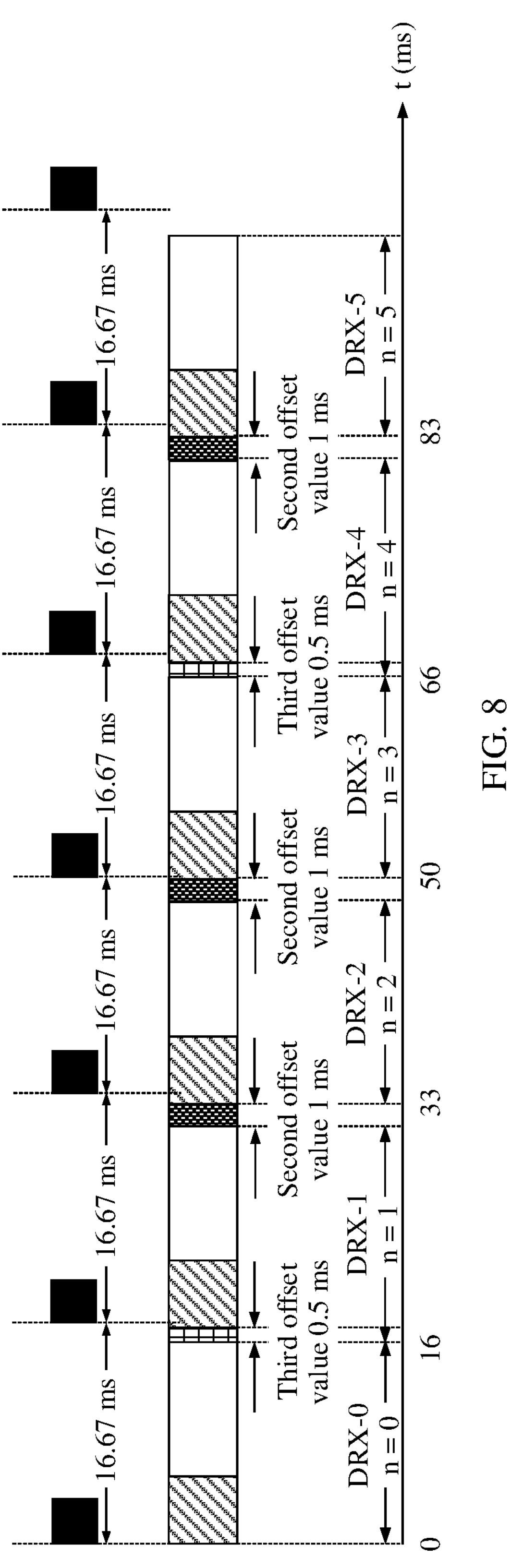

As shown in FIG. 8, when n=0, the cycle length of the first DRX+f2_1=0+0=0 ms, a start location of a DRX-0 is at 0 ms, the cycle length of the first DRX+f2_1+f3_1=0+0+0=0, and a start location of onDuration of the DRX-0 is at 0 ms. When n=1, the cycle length of the first DRX+f2_1=16+0=16 ms, a start location of a DRX-1 is at 16 ms, the cycle length of the first DRX+f2_1+f3_1=16+0+0.5=16.5 ms, and a start location of onDuration of the DRX-1 is at 16.5 ms. When n=2, the cycle length of the first DRX+f2_1=16+1=17 ms, and a start location of a DRX-2 is at 16+17=33 ms. In this case, a time interval between the start location of the DRX-2 and the start location of the DRX-1 is 17 ms, the cycle length of the first DRX+f2_1+f3_1=16+1+0=17, and a start location of onDuration of the DRX-2 is at 17 ms. When n=3, the cycle length of the first DRX+f2_1=16+1=17 ms, and a start location of a DRX-3 is at 33+17=5 0 ms. In this case, a time interval between the start location of the DRX-3 and the start location of the DRX-2 is 17 ms, the cycle length of the first DRX+f2_1+f3_1=16+1+0=17, and a start location of onDuration of the DRX-3 is at 50 ms. When n=4, the cycle length of the first DRX+f2_1=16+0=16 ms, a start location of a DRX-4 is at 50+16=66 ms, the cycle length of the first DRX+f2_1+f3_1=16+0+0.5=16.5, and a start location of onDuration of the DRX-4 is at 66.5 ms. When n=5, the cycle length of the first DRX+f2_1=16+1=17 ms, a start location of a DRX-5 is at 66+17=83 ms, the cycle length of the first DRX+f2_1+f3_1=16+1+0=17, and a start location of onDuration of the DRX-5 is at 83 ms. It can be seen from the DRX configuration shown in FIG. 8, an offset value between a start location of a DRX cycle and a start location of onDuration is dynamically adjusted, so that a difference between the start location of the onDuration and data arrival time is smaller. In this way, data packet arrival time can further match or approximately match start time of the DRX cycle.

In addition, there is still another possible implementation, and the third offset value f3 satisfies:

$$f3=\mathrm{floor}(32\times(D\times n-\mathrm{floor}(D\times n)))/32-\mathrm{floor}(32\times(D\times(n-1)-\mathrm{floor}(D\times(n-1))))/32,$$

where n represents an index value of a second DRX cycle, and μ is a parameter corresponding to a subcarrier spacing. D may be determined based on the first configuration information. For details, refer to the foregoing implementation to obtain a value of D. Details are not described herein again.

In this case, the terminal device determines, according to the following formula, a target subframe in which onDuration is located.

An SFN and a subframe number that correspond to a start location of a short DRX cycle satisfy: [(SFN×10)+subframe number] mod (drx-ShortCycle)=(drx-StartOffset+f2_1) mod (drx-ShortCycle).

An SFN and a subframe number that correspond to a start location of a long DRX cycle satisfy: [(SFN×10)+subframe number] mod (Drx-LongCycle)=drx-StartOffset+f2_1.

The start location of the second onDuration is a location obtained by offsetting backward a start location of the target subframe by drx-SlotOffset+f3_1, where drx-SlotOffset is an offset value that is of a start location of onDuration and that is configured by the network device, and f3_1=floor (32×(D×n−floor(D×n)))/32.

Specifically, an example in which a data packet arrival time interval is 16.67 ms, the DRX cycle set by the network device is 16 ms, μ−1, and drx-SlotOffset configured by the network device is 0 is used for description. D=0.67. When n=0, f3_1=0 ms; when n=1, f3_1= $^{21}/_{32}$=0.66 ms; when n=2, f3_1=$^{10}/_{32}$=0.31 ms; when n=3, f3_1=0 ms, when n=4, f3_1=0.66 ms; when n=5, f3_1=0.31 ms; and so on. A more accurate dynamic offset value may be used, so that data packet arrival time may match or approximately match start time of a DRX cycle.

In addition, with reference to a data transmission delay that may be caused by a jitter phenomenon in the foregoing data transmission, this application further provides another discontinuous reception configuration method. In this method, a network device delivers, to a terminal device, an indication that indicates a location at which the terminal device starts to monitor a PDCCH, to shorten monitoring duration.

Figures 9, 10:
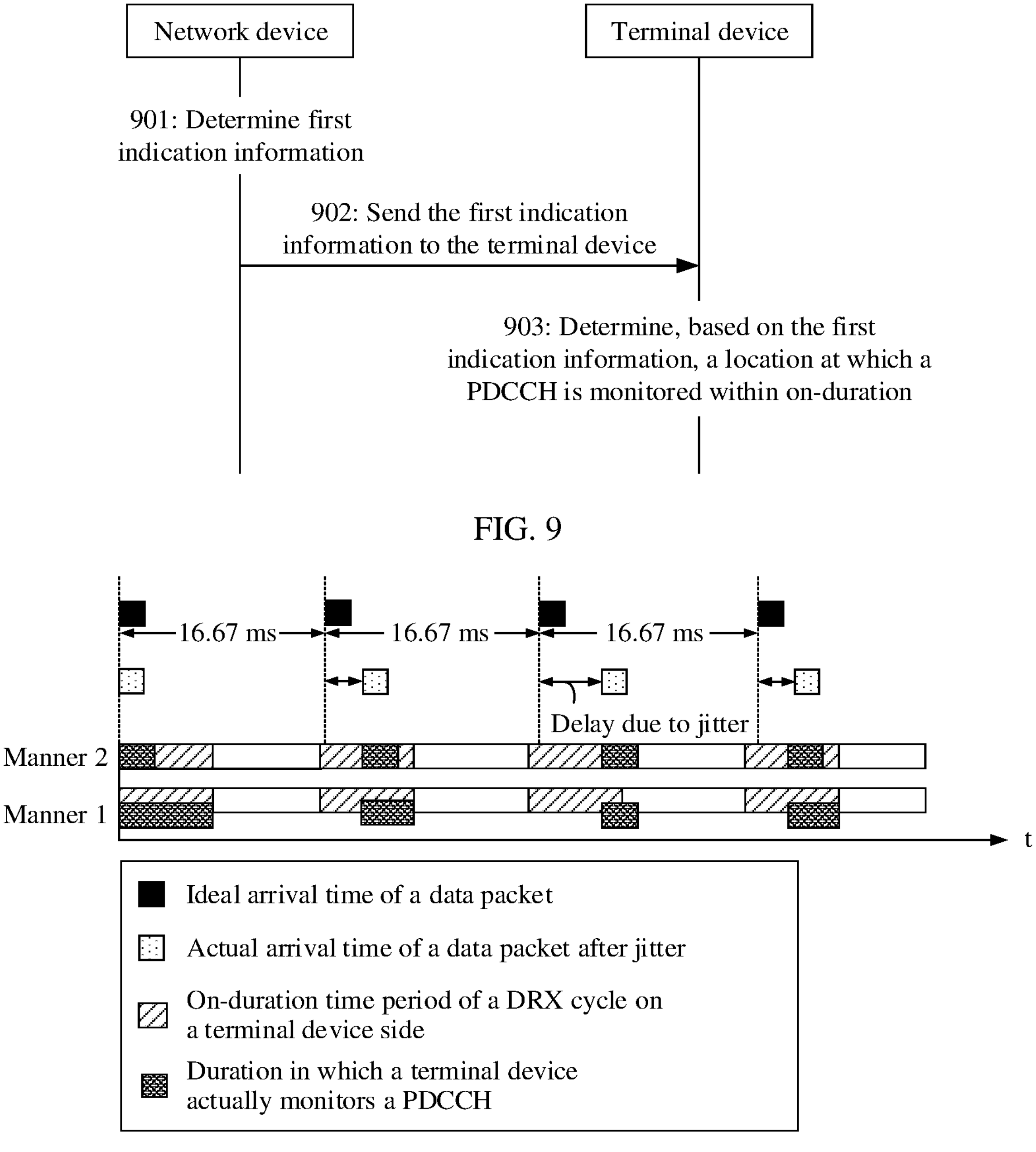
FIG. 9 is a schematic flowchart of another discontinuous reception configuration method according to an embodiment of this application.
FIG. 10 to FIG. 15 each are a schematic diagram of a scenario of a discontinuous reception configuration method according to an embodiment of this application.
Figure 11:
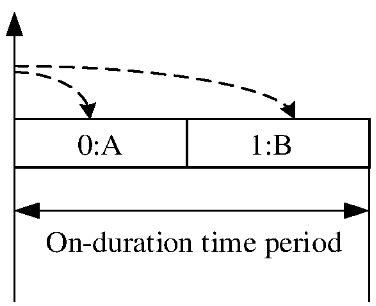

As shown in FIG. 9, the method includes the following steps.

901: The network device determines first indication information.

The first indication information is used by the terminal device to determine a location at which the PDCCH is monitored within onDuration.

Specifically, the first indication information may be used by the terminal device to determine a start location at which the PDCCH is monitored. For example, the first indication information may indicate a slot location at which the terminal device starts to monitor the PDCCH within the onDuration.

For example, when the first indication information is two bits, that the first indication information is 00 may indicate that PDCCH monitoring starts at a first location of the onDuration of a DRX cycle, that the first indication information is 01 may indicate that PDCCH monitoring starts at a second location of the onDuration of the DRX cycle, that the first indication information is 10 may indicates that PDCCH monitoring starts at a third location of the onDuration of the DRX cycle, and that the first indication information is 11 may indicate that PDCCH monitoring starts at a fourth location of the onDuration of the DRX cycle.

It should be noted that the slot location indicated by the first indication information may be obtained by pre-dividing a length of the onDuration of the DRX cycle by the network device. For example, the length of the onDuration of the DRX cycle may be divided into four equal parts, and each type of indication information corresponds to a location of a start slot of one onDuration segment. Alternatively, the first indication information may further indicate an index value of a slot in which PDCCH monitoring starts. Alternatively, the network device may estimate, based on a specific algorithm, possible time of sending a data packet that is currently to be sent and that is of the terminal device, to obtain a specific location of the PDCCH to be monitored. This is not specifically limited in this application.

Alternatively, the first indication information may indicate an offset value of a location at which PDCCH monitoring starts and that is within onDuration of a DRX cycle configured by the terminal device. For example, if the first indication information is 01, it indicates that PDCCH monitoring starts at a location obtained by offsetting a start location of the onDuration of the DRX cycle by offset 1.

902: The network device sends the first indication information to the terminal device.

Specifically, the first indication information sent by the network device to the terminal device may be located before the onDuration, for example, may be located in one or more slots before the onDuration. Alternatively, the first indication information may be located at a start location of the onDuration, for example, may be located at a beginning of a start slot of the onDuration.

903: The terminal device determines, based on the first indication information, the location at which the PDCCH is monitored within the onDuration.

In manner 1, the terminal device may monitor the PDCCH until active time ends. The active time may include an onDuration time period and an InactivityTimer time period that starts after the terminal device monitors the PDCCH. Alternatively, in manner 2, the terminal device may monitor the PDCCH based on monitoring duration preconfigured by the network device. In other words, each time the terminal device receives the first indication information, the terminal device may monitor the PDCCH at a location indicated by the first indication information within the preconfigured monitoring duration. For details, refer to the two manners shown in FIG. 10: a manner 1 and a manner 2. This is not specifically limited in this implementation of this application.

Further, in an implementation, the first indication information further indicates a time length for monitoring the PDCCH within the onDuration. That is, in addition to the location at which PDCCH monitoring starts, the first indication information may further include the time length for monitoring the PDCCH. Specifically, the first indication information may include a start slot for monitoring the PDCCH within the onDuration and a quantity of slots for monitoring the PDCCH.

For example, when the first indication information is two bits, the first indication information of the network device may be configured in the following Table 1.

TABLE 1

Correspondence between a value of first indication information and indicated content

| Value of first indication information | Indicated content of first indication information |
|---|---|
| 00 | First start location and first length |
| 01 | Second start location and second length |

TABLE 1-continued

| Correspondence between a value of first indication information and indicated content | |
|---|---|
| Value of first indication information | Indicated content of first indication information |
| 10 | Third start location and third length |
| 11 | Fourth start location and fourth length |

In another implementation, the first indication information further indicates at location at which monitoring the PDCCH is stopped within the onDuration. That is, in addition to the start location at which the PDCCH is monitored, the first indication information may further include an end location at which the PDCCH is monitored.

In addition, if the terminal device is configured to be capable of receiving the first indication information of the network device, but does not receive the first indication information at a corresponding location, the terminal device may perform the following operations. In a first case, the terminal device may start to monitor the PDCCH at the start location of the onDuration. In a second case, the terminal device does not monitor the PDCCH within the onDuration. In a third case, the terminal device determines, based on configuration information sent by the network device, that behavior of the terminal device belongs to the first case or the second case.

In the foregoing implementation, the network device may send, to the terminal device, specific indication information for monitoring the PDCCH, to shorten a time length for monitoring the PDCCH by the terminal device, and reduce power consumption of the terminal device.

In another possible implementation, the first indication information may indicate the terminal device to monitor the PDCCH in N of M areas in the onDuration of the DRX cycle, where the onDuration is divided into the M areas, M≥2, and N satisfies: 1≤N≤M.

For example, M is 2, that is, it indicates that the onDuration is divided into a first half area and a second half area, and the first indication information may indicate, through one bit, a location at which the PDCCH is monitored. For example, if the first indication information is 0, it indicates that the PDCCH is monitored in the first half area of the onDuration, and if the first indication information is 1, it indicates that the PDCCH is monitored in the second half area of the onDuration.

Specifically, when M is a positive integer greater than 2, the first indication information may indicate the terminal device to monitor the PDCCH in an $N^{th}$ area of the M areas in the onDuration of the DRX cycle. For example, if M is 4, and the first indication information is 01, it indicates that the PDCCH is monitored in a second area of the four areas in the onDuration.

For example, as shown in FIG. 1*i*, the terminal device may receive the first indication information at the start location of the onDuration, and divide the onDuration into an area A and an area B. If the first indication information is 0, the terminal device may start to monitor the PDCCH in the area A. If the first indication information is 1, the terminal device may start to monitor the PDCCH in the area B.

Further, the network device may further send second indication information to the terminal device, where the second indication information indicates locations at which the terminal device monitors the PDCCH and that are in the N areas.

That is, the onDuration time period may be divided into a first area and a second area, and the first area may be further divided into a first sub-area, a second sub-area, and the like. The first indication information may indicate to monitor the PDCCH in the first area in the onDuration, and the second indication information may indicate to monitor the PDCCH in the first sub-area in the first area.

Figure 12:
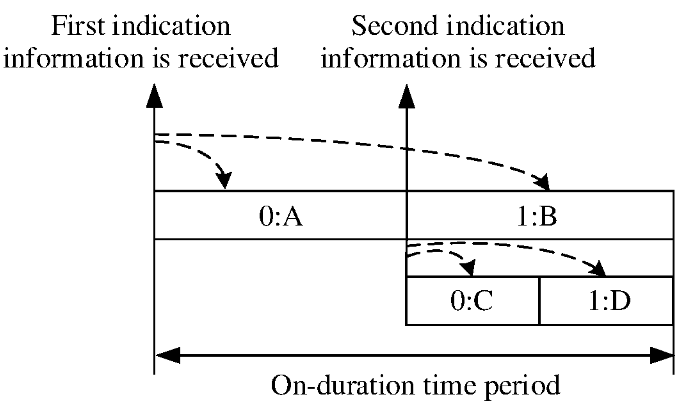

For example, as shown in FIG. 12, the terminal device may receive the first indication information at the start location of the onDuration, and divide the onDuration into an area A and an area B. If the first indication information is 0, the terminal device may start to monitor the PDCCH in the area A. If the first indication information is 1, the terminal device receives the second indication information at a start location of the area B, and further divides the area B into an area C and an area D. If the second indication information is 0, the terminal device starts to monitor the PDCCH in the area C. If the second indication information is 1, the terminal device monitors the PDCCH in the area D.

Further, in the foregoing implementation, the network device may configure content indicated by the first indication information by determining whether a data packet of a target terminal device arrives, that is, the network device may configure the start location of the onDuration to an earliest location at which the data packet arrives, or configure the start location of the onDuration after the earliest location at which the data packet arrives. In this case, a length of the onDuration may be configured to be less than or equal to a value range of jitter, for example, the length of the onDuration is less than or equal to 8 ms. If the network device determines that the data packet of the terminal device has arrived, the network device may indicate, through the first indication information, the terminal device to monitor the PDCCH in a first half of the onDuration. Otherwise, because the length of the onDuration already covers the value range of jitter, before the onDuration ends, a data packet definitely arrives. In this case, the network device may indicate, through the first indication information, the terminal device to monitor the PDCCH in a second half of the onDuration.

In the foregoing implementation of this application, the network device may shorten, through the indication information, at least half time for monitoring the PDCCH by the terminal device, and may control a data transmission delay within 0.5×onDuration. Low signaling overheads are used to shorten a time length for which the terminal device monitors the PDCCH and reduce power consumption of the terminal device.

In addition, this application further provides a discontinuous reception configuration method. In this method, a network device indicates, to a terminal device, a location at which the terminal device stops monitoring a PDCCH, to shorten a time length of invalid monitoring and reduce power consumption of the terminal device.

In an implementation, a rule for stopping monitoring the PDCCH by the terminal device may be defined, and the terminal device may determine, according to the rule, to stop monitoring the PDCCH.

The terminal device may stop monitoring the PDCCH at a moment before onDuration ends in a DRX cycle. In other words, the terminal device may determine, according to a predefined rule, to stop monitoring the PDCCH before the onDuration ends, and enter a sleep state in advance.

Specifically, the rule for stopping monitoring the PDCCH may be specifically as follows: The terminal device determines to stop monitoring the PDCCH after an Inactivity-Timer expires, or the terminal device determines to stop monitoring the PDCCH when the InactivityTimer expires. For example, the rule indicates the terminal device to stop monitoring the PDCCH at a first moment, where the first moment may be a moment at which the InactivityTimer of the terminal device expires, or a moment after the InactivityTimer expires.

Figures 13, 14:
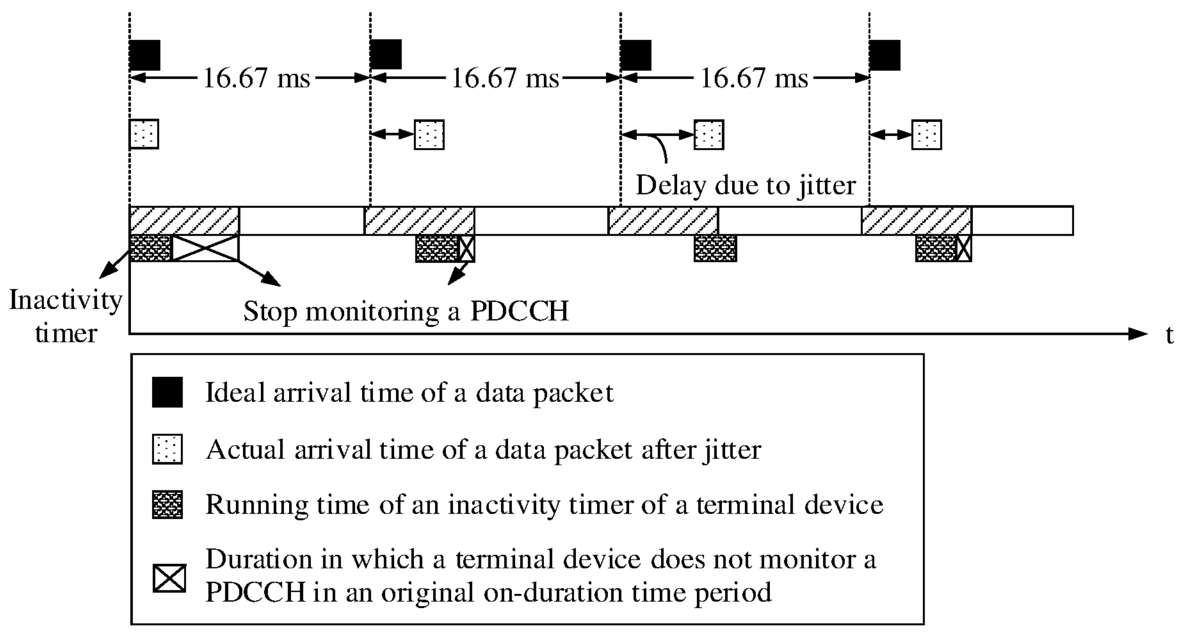

For example, as shown in FIG. 13, the terminal device may stop monitoring the PDCCH after determining, within the onDuration of the DRX cycle, that the InactivityTimer expires. That is, the terminal device stops monitoring the PDCCH in a subsequent time period of the original onDuration, and enters the sleep state in advance. This shortens a time length for continuously monitoring the PDCCH.

It should be noted that, in this embodiment of this application, that the terminal device is within the onDuration of the DRX cycle is equivalent to that an onDurationTimer of the terminal device does not expire. That the terminal device stops monitoring the PDCCH when or after the InactivityTimer expires may specifically include: The terminal device stops monitoring the PDCCH when the onDurationTimer of the DRX cycle does not expire and when or after the InactivityTimer expires.

Further, the network device may send second configuration information to the terminal device, to configure or enable the rule for stopping monitoring the PDCCH for the terminal device, so that the terminal device may enable the rule for stopping monitoring the PDCCH based on the second configuration information. For example, the terminal device determines to stop monitoring the PDCCH after the InactivityTimer expires, and enters the sleep state. Optionally, the second configuration information is RRC signaling.

In the foregoing implementation, the network device and the terminal device may predetermine the rule for stopping monitoring the PDCCH, so that the terminal device can stop monitoring the PDCCH when determining that the InactivityTimer expires. Because a data packet has arrived within an onDuration time period, the terminal device starts the InactivityTimer. In this case, based on a transmission feature of an XR or an XR-like service, no other data packet arrives in the DRX cycle. Therefore, after the InactivityTimer expires, the terminal device may terminate the onDuration time period in advance, or stops the onDurationTimer in advance, so that the terminal device stops monitoring the PDCCH, and enters the sleep state, to save power. In another manner, another timer may alternatively be used to control behavior of stopping monitoring the PDCCH. For example, the network device may configure, for the terminal device, a first timer that is different from the InactivityTimer, and the terminal device determines to stop monitoring the PDCCH after the first timer expires, or the terminal device determines to stop monitoring the PDCCH when the first timer expires. Specifically, after the first timer expires, the terminal device may terminate the onDuration time period in advance, or stop the onDurationTimer in advance. In addition, after the first timer expires, the terminal device may further stop the InactivityTimer in advance, and the terminal device stops monitoring the PDCCH, and enters the sleep state, to save power. The foregoing description is also applicable to embodiments described below.

NR supports hybrid automatic repeat request (HARQ) retransmission. A specific HARQ process is as follows:

For downlink data transmission, a terminal device sends a HARQ feedback to a network device, to indicate whether a PDSCH is successfully received. If the network device determines that the terminal device fails to decode the PDSCH, the network device may schedule retransmission of the PDSCH. Because the network device determines content (that is, the terminal device fails to receive the PDSCH) carried in the HARQ feedback, and the network device needs a specific period of time to send a PDCCH to schedule the retransmission of the PDSCH, the network device definitely does not schedule retransmission of a data packet in this period of time. Even if the terminal device monitors retransmission scheduling of the data packet in this period of time, the terminal device does not receive the retransmission scheduling. Therefore, a HARQ round trip time (RTT) timer is defined in a current standard. After sending a negative acknowledgment (negative acknowledgment, NACK) to the network device, the terminal device starts the HARQ RTT timer. During running time of the HARQ RTT timer, the terminal device does not expect to receive retransmission of a corresponding data packet. The standard also defines a HARQ retransmission timer. After the HARQ RTT timer expires, the HARQ retransmission timer starts. If the terminal device sends the NACK to the network device, the terminal device monitors and expects to receive the retransmission of the corresponding data packet within running time of the HARQ retransmission timer.

NR does not support the HARQ feedback for uplink data transmission. After the network device fails to receive the PUSCH transmitted by the terminal device, the network device may directly send a PDCCH for scheduling retransmission of the PUSCH. Similar to downlink transmission, the NR standard also defines a HARQ RTT timer and a HARQ retransmission timer for uplink transmission. However, because there is no HARQ feedback in uplink transmission, the terminal device immediately starts the HARQ RTT timer after sending the PUSCH. During running time of the HARQ RTT timer, the terminal device does not expect to receive retransmission of a corresponding data packet. The HARQ retransmission timer is similar to the HARQ retransmission timer used in downlink transmission. After the HARQ RTT timer expires, the HARQ retransmission timer starts. During running time of the HARQ retransmission timer, the terminal device monitors and expects to receive retransmission of a corresponding data packet.

In addition, to support parallel processing of a plurality of data packets, NR supports a plurality of HARQ processes, each process may correspond to one data packet, and data packets corresponding to the plurality of processes are processed in parallel. Whether a data packet corresponding to one HARQ process is successfully transmitted does not affect transmission of a data packet corresponding to another HARQ process. To ensure that the HARQ processes do not affect each other, the HARQ RTT timer and the HARQ retransmission timer mentioned above are configured for each HARQ process (per HARQ process). That is, the network device configures a corresponding HARQ RTT timer and a corresponding HARQ retransmission timer for each HARQ process. Currently, in NR, a maximum of 16 HARQ processes exist in uplink transmission, and a maximum of 16 HARQ processes exist in downlink transmission.

In the foregoing method, only a relationship between the InactivityTimer and the onDurationTimer is discussed, and impact of the InactivityTimer on the HARQ retransmission timer is not discussed.

In a possible implementation, after the InactivityTimer expires, the terminal device monitors the PDCCH within the running time of the HARQ retransmission timer. In other words, if the terminal device sends the NACK to the network device, the terminal device monitors the PDCCH within the running time of the HARQ retransmission timer and after the InactivityTimer expires, and may stop monitoring the PDCCH until or after the HARQ retransmission timer expires.

According to this method, if transmission of an uplink data packet or a downlink data packet fails, and the data packet needs to be retransmitted, the data packet can be quickly retransmitted within the running time of the HARQ retransmission timer, to reduce a data transmission delay. Specifically, the uplink data packet or the downlink data packet may include a data packet dynamically scheduled (DG) through DCI, or may include a data packet transmitted through a CG (configuration grant) or an SPS (semi-persistent scheduling).

It should be noted that running of the InactivityTimer and running of the HARQ retransmission timer do not affect each other, and running time of the InactivityTimer may or may not overlap the running time of the HARQ retransmission timer. For example, when the running time of the InactivityTimer is relatively long, and/or the running time of the HARQ RTT timer is relatively short, the HARQ RTT timer may already expire before the InactivityTimer expires, and the HARQ retransmission timer is started. In this case, the running time of the InactivityTimer overlaps the running time of the HARQ retransmission timer. If the HARQ retransmission timer expires before the InactivityTimer expires, the terminal device monitors the PDCCH within the entire running time (including the running time of the HARQ retransmission timer) of the InactivityTimer. If the HARQ retransmission timer expires only after the InactivityTimer expires, the terminal device monitors the PDCCH within the entire running time of the InactivityTimer, and also monitors the PDCCH in remaining running time of the HARQ retransmission timer according to the foregoing method. For another example, when the running time of the InactivityTimer is relatively short, and/or the running time of the HARQ RTT timer is relatively long, the HARQ RTT timer may expire only after the InactivityTimer expires, that is, the HARQ retransmission timer is started only after the InactivityTimer expires. In this case, the running time of the InactivityTimer does not overlap the running time of the HARQ retransmission timer. In this case, the terminal device monitors the PDCCH within the entire running time of the InactivityTimer, and also monitors the PDCCH in subsequent running time of the HARQ retransmission timer according to the foregoing method.

In another possible manner, after the InactivityTimer expires, the terminal device does not monitor the PDCCH within the running time of the HARQ retransmission timer. In other words, if the terminal device sends the NACK to the network device, the terminal device stops monitoring the PDCCH within the running time of the HARQ retransmission timer and after the InactivityTimer expires. That is, the terminal device does not monitor the PDCCH in a subsequent time period of original onDuration, and enters a sleep state in advance, to shorten a time length for continuously monitoring the PDCCH.

According to this method, the terminal device may be in the sleep state for longer time, thereby reducing power consumption and saving power.

Further, the network device may send third configuration information to the terminal device, to configure, for the terminal device, a rule specifying that the terminal device monitors the PDCCH (or not to monitor the PDCCH, or whether to monitor the PDCCH) within the running time of the HARQ retransmission timer and after the InactivityTimer expires. The third configuration information may be configuration information that is the same as the second configuration information, or configuration information different from the second configuration information. Optionally, the third configuration information may be RRC signaling.

For example, the network device sends the third configuration information to the terminal device, to indicate the terminal device to monitor the PDCCH within the running time of the HARQ retransmission timer and after the InactivityTimer expires. If the network device does not send the third configuration information to the terminal device, it indicates that the terminal device does not monitor the PDCCH within the running time of the HARQ retransmission timer and after the InactivityTimer expires.

Alternatively, the network device sends the third configuration information to the terminal device, to indicate the terminal device not to monitor the PDCCH within the running time of the HARQ retransmission timer and after the InactivityTimer expires. If the network device does not send the third configuration information to the terminal device, it indicates that the terminal device monitors the PDCCH within the running time of the HARQ retransmission timer and after the InactivityTimer expires.

Alternatively, the network device sends the third configuration information to the terminal device, and when a value of the third configuration information is 1, the terminal device may be indicated not to monitor the PDCCH within the running time of the HARQ retransmission timer and after the InactivityTimer expires. When the value of the third configuration information is 0, the terminal device may be indicated to monitor the PDCCH within the running time of the HARQ retransmission timer and after the InactivityTimer expires. A value setting rule of the third configuration information is not specifically limited in this application, and the foregoing is merely an example.

In another possible manner, the network device may send third configuration information to the terminal device, to configure, for the terminal device, a rule specifying that the terminal device monitors the PDCCH (or not to monitor the PDCCH, or whether to monitor the PDCCH) within the running time of the HARQ retransmission timer. In this case, behavior of the terminal device configured in the third configuration information is related only to whether the HARQ retransmission timer runs, and is irrelevant to whether the InactivityTimer runs. When the third configuration information configures that the terminal device monitors the PDCCH within the running time of the HARQ retransmission timer, regardless of whether the running time of the InactivityTimer overlaps the running time of the HARQ retransmission timer, the terminal device monitors the PDCCH within the running time of the HARQ retransmission timer. When the third configuration information configures that the terminal device does not monitor the PDCCH within the running time of the HARQ retransmission timer, and when the running time of the InactivityTimer overlaps the running time of the HARQ retransmission timer, the terminal device monitors the PDCCH due to impact of the InactivityTimer; and when the running time of the InactivityTimer does not overlap the running time of the HARQ retransmission timer, the terminal device does not monitor the PDCCH.

In another implementation, the foregoing InactivityTimer may alternatively be another timer, for example, a first timer. In this case, the terminal device determines to stop monitoring the PDCCH within the running time of the HARQ retransmission timer and when or after the first timer expires. This is not specifically limited in this application.

In addition, in another possible implementation, the network device may send third indication information to the terminal device, to determine a location at which monitoring the PDCCH is stopped. In this case, the terminal device may determine, based on the third indication information, the location at which monitoring the PDCCH is stopped.

The third indication information may include time domain resource information of a first moment, to indicate that the terminal device may stop monitoring the PDCCH at the first moment.

In this case, the terminal device may stop monitoring the PDCCH at the first moment based on the third indication information. Specifically, the terminal device may stop running the InactivityTimer and the onDurationTimer at the first moment based on the third indication information.

According to the foregoing implementations of this application, a time length for which the terminal device invalidly monitors the PDCCH after a data packet is transmitted can be reduced, and power consumption of the terminal device can be reduced.

In addition, if a DRX cycle configured by the network device for the terminal device is short, this application further provides an implementation. The network device sends fourth indication information to the terminal device, so that the terminal device can start or restart the InactivityTimer, to prolong active time and monitor the PDCCH.

In an implementation, the network device may send the fourth indication information to the terminal device, and the terminal device may start or restart the InactivityTimer based on the fourth indication information.

The fourth indication information sent by the network device to the terminal device may be located before or within onDuration. For example, the network device may send the fourth indication information at a moment at which PDCCH monitoring is about to end, that is, at a moment before the onDuration ends. The fourth indication information is not used to schedule data transmission, and only indicates that the terminal device may start or restart the InactivityTimer after PDCCH monitoring ends, for example, in a last slot of the onDuration.

For example, as shown in FIG. 14, the terminal device receives the fourth indication information within the onDuration, and then starts the InactivityTimer after the onDuration.

In another implementation, the fourth indication information may further include an indication of a first time period. In other words, the terminal device may determine, based on the fourth indication information, to monitor the PDCCH in the first time period after the onDuration of the DRX cycle. The first time period may be a data packet transmission time period that is other than an onDuration time period and that is estimated by the network device. Specifically, the terminal device may determine, based on the fourth indication information, to start or restart the InactivityTimer in the first time period after the onDuration of the DRX cycle, to monitor the PDCCH.

Figure 15:
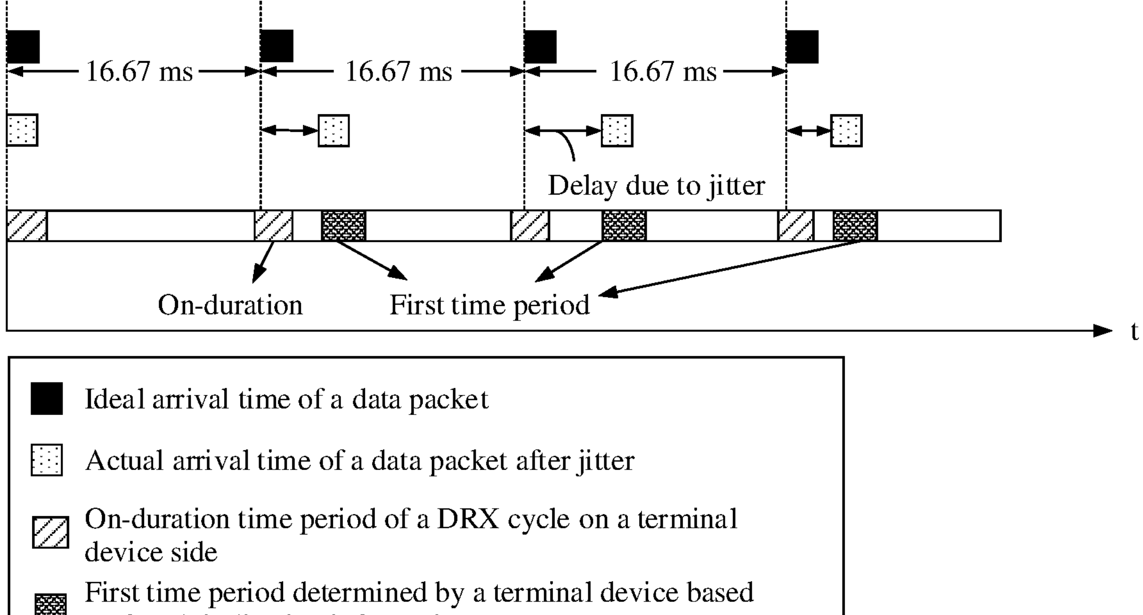

For example, as shown in FIG. 15, the terminal device receives the fourth indication information within the onDuration, and then monitors the PDCCH in the first time period after the onDuration based on the fourth indication information.

Alternatively, the fourth indication information sent by the network device to the terminal device may be located before the onDuration, or may be located at a start location of the onDuration. When the network device determines that a data packet of the terminal device is not scheduled within the onDuration, the network device may directly indicate, through the fourth indication information, the terminal device not to monitor the PDCCH within the onDuration, but may indicate the terminal device to monitor the PDCCH in the first time period after the onDuration.

In the foregoing implementation, when the DRX cycle configured for the terminal device is short, the network device may send the fourth indication information to the terminal device, so that the terminal device can start or restart the InactivityTimer, to prolong the active time of the terminal device. Therefore, flexibility of monitoring a PDCCH configuration is improved.

Correspondingly, in an implementation, the network device side may maintain DRX configuration information corresponding to one or more terminal devices. For example, the network device maintains a start moment of onDuration, duration of the onDuration, and a start moment of an InactivityTimer of a terminal device.

In the foregoing implementation, when the network device determines that, when or after the InactivityTimer corresponding to the terminal device expires, the network device may stop sending the PDCCH, and/or stop an onDurationTimer that corresponds to the terminal device and that is maintained on a network device side. In another implementation, when the network device determines that, when the InactivityTimer corresponding to the terminal device expires and a HARQ retransmission timer is running, the network device may stop sending the PDCCH, and/or stop an onDurationTimer that corresponds to the terminal device and that is maintained on a network device side. In this case, when the terminal device enters a sleep state in advance and stops monitoring the PDCCH before the onDurationTimer expires in the DRX cycle, the network device may also stop sending the PDCCH, so that a DRX configuration maintained on the network device side is aligned with a DRX configuration on a terminal device side, thereby ensuring communication efficiency between the network device and the terminal device while improving energy-saving efficiency of the terminal device.

It should be noted that in the foregoing several implementations, the first indication information, the second indication information, the third indication information, or the fourth indication information may be carried in at least one bit of downlink control signaling (Downlink Control Information, DCI).

It may be understood that a same step or a step or a message having a same function in embodiments of this application may be mutually referenced in different embodiments.

Based on the foregoing implementations, this application further provides a communication apparatus. The communication apparatus may be a terminal device. The communication apparatus has a function of implementing the terminal device in the foregoing possible implementations. The function may be implemented by hardware, or may be implemented by hardware executing corresponding software. The hardware or the software includes one or more modules corresponding to the foregoing function.

Figure 16:
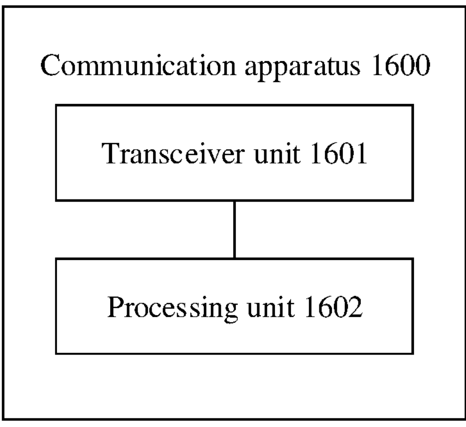
FIG. 16 is a schematic diagram of a structure of a discontinuous reception configuration apparatus according to an embodiment of this application.

In a possible design, as shown in FIG. 16, the communication apparatus 1600 may include a transceiver unit 1601 and a processing unit 1602. These units may perform corresponding functions of the terminal device in the foregoing possible implementations.

For example, referring to the step 401 in the foregoing embodiments, the transceiver unit 1601 may be configured to receive DRX configuration information from a network device. The processing unit 1602 may be configured to determine a start location of first onDuration and a start location of second onDuration based on the DRX configuration information, and receive a downlink signal within the first onDuration and the second onDuration.

In addition, in another implementation, referring to FIG. 9, the transceiver unit 1601 may be further configured to receive first indication information from a network device. Refer to the step 903 in the foregoing embodiments. The processing unit 1602 may be further configured to determine, based on the first indication information, a location at which a PDCCH is monitored within onDuration.

Specifically, the communication apparatus 1600 may implement functions of the terminal device in the foregoing possible implementations. For details, refer to detailed descriptions in the foregoing method examples. Details are not described herein again.

In addition, this application further provides a communication apparatus. The communication apparatus may be a network device. The communication apparatus has a function of implementing the network device in the foregoing possible implementations. The function may be implemented by hardware, or may be implemented by hardware executing corresponding software. The hardware or the software includes one or more modules corresponding to the foregoing function.

Figure 17:
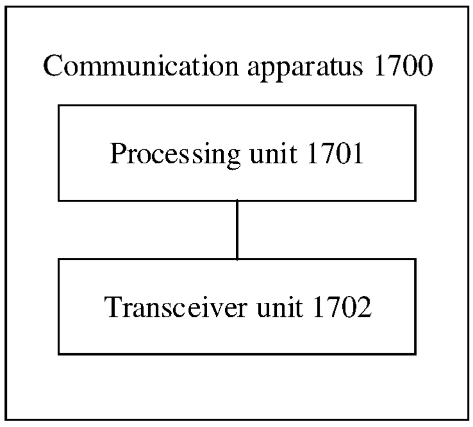
FIG. 17 is a schematic diagram of a structure of another discontinuous reception configuration apparatus according to an embodiment of this application.

In a possible design, as shown in FIG. 17, the communication apparatus 1700 may include a processing unit 1701 and a transceiver unit 1702. These units may perform corresponding functions of the terminal device in the foregoing possible implementations.

For example, referring to the step 401 in the foregoing embodiments, the processing unit 1701 may be configured to determine DRX configuration information corresponding to a terminal device. The transceiver unit 1702 may be configured to send the DRX configuration information to the terminal device.

In addition, in another implementation, referring to step 901 in FIG. 9, the processing unit 1701 may be configured to determine first indication information. Refer to the step 902 in FIG. 9. The transceiver unit 1601 may be further configured to send the first indication information to a terminal device.

Specifically, the communication apparatus 1700 may implement functions of the network device in the foregoing possible implementations. For details, refer to detailed descriptions in the foregoing method examples. Details are not described herein again.

It may be understood that, with reference to FIG. 2, when the foregoing apparatus is an electronic device, the foregoing transmission module may be a transceiver, and may include an antenna, a radio frequency circuit, and the like, and the processing module may be a processor, for example, a baseband chip. When the apparatus is a component having a function of a first communication device and/or a second communication device in the foregoing embodiments, the transmission module may be a radio frequency unit, and the processing module may be a processor. When the apparatus is a chip system, the transmission module may be an input interface and/or an output interface of the chip system, and the processing module may be a processor of the chip system, for example, a central processing unit (CPU).

It should be noted that for specific execution processes and embodiments of the foregoing apparatus, refer to steps performed by the terminal device or the network device in the foregoing method embodiments and related descriptions. For technical problems to be resolved and brought technical effects, refer to content in the foregoing embodiments. Details are not described herein again.

In this embodiment, a sidelink transmission apparatus is presented in a form of dividing functional modules in an integrated manner. The "module" herein may be a specific circuit, a processor and a memory that execute one or more software or firmware programs, an integrated logic circuit, and/or another component that can provide the foregoing functions. In a simple embodiment, a person skilled in the art may figure out that the sidelink transmission apparatus may be in a form shown in FIG. 2.

For example, a function/implementation process of the processing unit 1602 in FIG. 16 or the processing unit 1701 in FIG. 17 may be implemented by the processor 201 in FIG. 2 by invoking computer program instructions stored in the memory 204. For example, a function/implementation process of the transceiver unit 1601 in FIG. 16 or the transceiver unit 1702 in FIG. 17 may be performed by using the communication interface 203 in FIG. 2.

In some implementations, the processor 201 in FIG. 2 may invoke computer-executable instructions stored in the memory 204, to enable the apparatus 200 to perform operations of the terminal device or the network device in the foregoing method embodiments, to implement the foregoing possible implementation methods of this application.

Communication apparatuses in the foregoing apparatus embodiments may completely correspond to the terminal device or the network device in the method embodiments, and a corresponding module or unit performs a corresponding step. For example, when the apparatus is implemented in a form of a chip, the transceiver unit may be an interface circuit used by the chip to receive a signal from another chip or apparatus. The foregoing transceiver unit used for sending or receiving is an interface circuit of the apparatus, and is configured to send a signal to another apparatus. For example, when the apparatus is implemented in a form of a chip, the transceiver unit may be an interface circuit configured to send a signal to another chip or apparatus.

In an example embodiment, a computer-readable storage medium or a computer program product that includes instructions is further provided. The instructions may be executed by the processor 201 of the communication apparatus 200 to complete the methods in the foregoing embodiments. Therefore, for technical effects that can be achieved by the computer-readable storage medium, refer to the foregoing method embodiments. Details are not described herein again.

This application further provides a computer program product. The computer program product includes instructions. When the instructions are executed, a computer may be enabled to separately perform an operation of the terminal device or the network device corresponding to the foregoing methods.

An embodiment of this application further provides a system chip. The system chip includes a processing unit and a communication unit. The processing unit may be, for example, a processor, and the communication unit may be, for example, an input/output interface, a pin, a circuit, or the like. The processing unit may execute computer instructions, to enable a communication apparatus that uses the chip to perform operations of the terminal device and the network device in the methods provided in embodiments of this application.

Optionally, any communication apparatus provided in embodiments of this application may include the system chip.

Optionally, the computer instructions are stored in a storage unit.

An embodiment of this application further provides a communication system. The communication system may include any terminal device and any network device in the foregoing implementations.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus.

A person skilled in the art can easily figure out another implementation solution of this application after considering the specification and practicing the present invention that is disclosed herein. This application is intended to cover any variations, functions, or adaptive changes of this application. These variations, functions, or adaptive changes comply with general principles of this application, and include common knowledge or a commonly used technical means in the technical field that is not disclosed in this application.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:

receiving discontinuous reception (DRX) configuration information, wherein the DRX configuration information comprises configuration information of a first DRX, and the configuration information of the first DRX comprises a cycle length of the first DRX; and determining, based on the DRX configuration information, a start location of a first onDuration and a start location of a second onDuration, and receiving a downlink signal within the first onDuration and the second onDuration, wherein the second onDuration is a next onDuration after the first onDuration, a time interval between the start location of the first onDuration and the start location of the second onDuration is greater than the cycle length of the first DRX, the time interval between the start location of the first onDuration and the start location of the second onDuration is determined based on the cycle length of the first DRX and a second offset value, and the second offset value is determined based on at least an index value of a DRX cycle in which the second onDuration is located.

2. The method according to claim 1, wherein the time interval between the start location of the first onDuration and the start location of the second onDuration is equal to a sum of the cycle length of the first DRX and the second offset value.

3. The method according to claim 1, wherein the second offset value f2 satisfies:

$f2=\text{floor}(D\times n)-\text{floor}(D\times(n-1))$, wherein a floor( ) function is used to run down an input parameter, n is the index value of the DRX cycle in which the second onDuration is located, and D is determined based on first configuration information.

4. The method according to claim 3, further comprising: receiving the first configuration information from a network device, wherein the first configuration information comprises a value of D.

5. The method according to claim 3, further comprising: receiving the first configuration information from a network device, wherein the first configuration information comprises a data frame arrival time, and the value of D is determined based on the data frame arrival time and the cycle length of the first DRX.

6. The method according to claim 1, wherein the time interval between the start location of the first onDuration and the start location of the second onDuration is further determined based on a third offset value.

7. The method according to claim 6, wherein the time interval between the start location of the first onDuration and the start location of the second onDuration is equal to a sum of the cycle length of the first DRX, the second offset value, the third offset value, and drx-SlotOffset, and drx-SlotOffset is an offset value that is configured by a network device and that is used to determine a start location of at least one onDuration.

8. The method according to claim 6, wherein the third offset value f3 satisfies:

$$f3=\text{floor}(2^{\mu}\times(D\times n-\text{floor}(D\times n)))/2^{\mu}-\text{floor}(2^{\mu}\times D\times(n-1)-\text{floor}(D\times(n-1))))/2^{\mu}$$

wherein a floor ( ) function is used to round down an input parameter, n represents an index value of a second DRX cycle, μ is a parameter corresponding to a subcarrier spacing, and D is determined based on first configuration information.

9. A non-transitory computer-readable storage medium, wherein the non-transitory computer-readable storage medium stores computer-executable instructions, and when being invoked by a computer, the computer-executable instructions are used to enable the computer to perform the method according to claim 1.

10. A communication apparatus, comprising one or more processors and one or more memories, wherein the one or more memories are coupled to the one or more processors, the one or more memories are configured to store instructions, and when the one or more processors execute the instructions, the communication apparatus is enabled to perform the method according to claim 1.

11. A method, comprising:

sending discontinuous reception (DRX) configuration information, wherein the DRX configuration information comprises configuration information of a first DRX, and the configuration information of the first DRX comprises a cycle length of the first DRX; and wherein the DRX configuration information is used to determine to receive a downlink signal within a first onDuration and a second onDuration, wherein the second onDuration is a next onDuration after the first onDuration, a time interval between a start location of the first onDuration and a start location of the second onDuration is greater than the cycle length of the first DRX, the time interval between the start location of the first onDuration and the start location of the second onDuration is determined based on the cycle length of the first DRX and a second offset value, and the second offset value is determined based on at least an index value of a DRX cycle in which the second onDuration is located.

12. The method according to claim 11, wherein the time interval between the start location of the first onDuration and the start location of the second onDuration is equal to a sum of the cycle length of the first DRX and the second offset value.

13. The method according to claim 11, wherein the second offset value f2 satisfies:

f2=floor(D×n)−floor(D×(n−1)), wherein a floor ( ) function is used to round down an input parameter, n is the index value of the DRX cycle in which the second onDuration is located, and D is determined based on first configuration information.

14. The method according to claim 13, further comprising:

sending the first configuration information to a terminal device, wherein the first configuration information comprises a value of D.

15. The method according to claim 13, further comprising:

sending the first configuration information to a terminal device, wherein the first configuration information comprises a data frame arrival time, and wherein the terminal device determines the value of D based on the data frame arrival time and the cycle length of the first DRX.

16. The method according to claim 11, wherein the time interval between the start location of the first onDuration and the start location of the second onDuration is further determined based on a third offset value.

17. The method according to claim 16, wherein the time interval between the start location of the first onDuration and the start location of the second onDuration is equal to a sum of the cycle length of the first DRX, the second offset value, the third offset value, and drx-SlotOffset, and drx-SlotOffset is an offset value that is configured by a network device and that is used to determine a start location of onDuration.

18. The method according to claim 16, wherein the third offset value f3 satisfies:

$$f_3 = \text{floor}(2^{\mu} \times (D \times n - \text{floor}(D \times n)))/2^{\mu} - \text{floor}(2^{\mu} \times (D \times (n-1) - \text{floor}(D \times (n-1))))/2^{\mu},$$

wherein a floor ( ) function is used to round down an input parameter, n represents an index value of a second DRX cycle, μ is a parameter corresponding to a subcarrier spacing, and D is determined based on first configuration information.

19. A terminal device, comprising:

one or more processors and one or more memories, wherein the one or more memories are coupled to the one or more processors, the one or more memories store computer program code, the computer program code comprises computer instructions, and when the one or more processors execute the computer instructions, the terminal device is enabled to perform operations comprising:

receiving discontinuous reception (DRX) configuration information, wherein the DRX configuration information comprises at least configuration information of a first DRX, and the configuration information of the first DRX comprises a cycle length of the first DRX; and determining, based on the DRX configuration information, a start location of a first onDuration and a start location of a second onDuration, and receiving a downlink signal within the first onDuration and the second onDuration, wherein the second onDuration is a next onDuration after the first onDuration, a time interval between the start location of the first onDuration and the start location of the second onDuration is greater than the cycle length of the first DRX, the time interval between the start location of the first onDuration and the start location of the second onDuration is determined based on the cycle length of the first DRX and a second offset value, and the second offset value is determined based on at least an index value of a DRX cycle in which the second onDuration is located.

20. The terminal device according to claim 19, wherein the time interval between the start location of the first onDuration and the start location of the second onDuration is equal to a sum of the cycle length of the first DRX and the second offset value.

* * * * *